(12) United States Patent
Rejman et al.

(10) Patent No.: US 12,542,323 B2
(45) Date of Patent: Feb. 3, 2026

(54) RECHARGEABLE BATTERY PACK

(71) Applicant: Robert Bosch GmbH, Stuttgart (DE)

(72) Inventors: Marcin Rejman, Waiblingen (DE);
Benjamin Grauer, Stuttgart (DE);
Thorsten Seidel, Remseck (DE);
Mickael Segret, Stuttgart (DE)

(73) Assignee: ROBERT BOSCH GMBH, Stuttgart (DE)

( * ) Notice: Subject to any disclaimer, the term of this patent is extended or adjusted under 35 U.S.C. 154(b) by 1442 days.

(21) Appl. No.: 17/255,700

(22) PCT Filed: Jun. 5, 2019

(86) PCT No.: PCT/EP2019/064568
§ 371 (c)(1),
(2) Date: Dec. 23, 2020

(87) PCT Pub. No.: WO2020/001943
PCT Pub. Date: Jan. 2, 2020

(65) Prior Publication Data
US 2021/0288370 A1    Sep. 16, 2021

(30) Foreign Application Priority Data
Jun. 29, 2018 (DE) .......................... 102018210663.0

(51) Int. Cl.
| | |
|---|---|
| *H01M 50/242* | (2021.01) |
| *B25F 5/02* | (2006.01) |
| *H01M 50/213* | (2021.01) |
| *H01M 50/247* | (2021.01) |

(52) U.S. Cl.
CPC ............. *H01M 50/242* (2021.01); *B25F 5/02* (2013.01); *H01M 50/213* (2021.01); *H01M 50/247* (2021.01); *H01M 2220/30* (2013.01)

(58) Field of Classification Search
None
See application file for complete search history.

(56) References Cited

U.S. PATENT DOCUMENTS

| | | | |
|---|---|---|---|
| 5,152,551 A | 10/1992 | Sakane et al. | |
| 2011/0086252 A1* | 4/2011 | Phillips | H01M 50/325 29/623.2 |
| 2014/0272517 A1* | 9/2014 | Glasgow | B25F 5/008 429/120 |

FOREIGN PATENT DOCUMENTS

| | | |
|---|---|---|
| CN | 104521027 A | 4/2015 |
| CN | 205406571 U | 7/2016 |
| DE | 102015204044 A1 | 9/2016 |
| DE | 102016203427 A1 | 9/2017 |
| JP | 2007234370 A | 9/2007 |

(Continued)

OTHER PUBLICATIONS

Machine translation of JP 2008010315 (Year: 2008).*
International Search Report for PCT/EP2019/064568, Issued Aug. 22, 2019.

*Primary Examiner* — Maria Laios
(74) *Attorney, Agent, or Firm* — NORTON ROSE FULBRIGHT US LLP

(57) ABSTRACT

A rechargeable battery pack, in particular a rechargeable battery pack for a hand-held power tool. The rechargeable battery pack includes a housing in which at least one rechargeable battery cell is accommodated. It is provided that the rechargeable battery pack includes at least one protective element that is connected to the housing.

15 Claims, 19 Drawing Sheets

(56) References Cited

FOREIGN PATENT DOCUMENTS

| | | | |
|---|---|---|---|
| JP | 2008010315 A | * | 1/2008 |
| JP | 2011198472 A | | 10/2011 |
| JP | 2012079547 A | | 4/2012 |
| JP | 2013008524 A | | 1/2013 |
| JP | 2014049225 A | | 3/2014 |
| JP | 2017069004 A | | 4/2017 |
| WO | 2017108317 A1 | | 6/2017 |

* cited by examiner

RECHARGEABLE BATTERY PACK

BACKGROUND INFORMATION

German Patent Application No. DE 10 2016 203 427 A1 describes a rechargeable battery pack for a hand-held power tool, including a rechargeable battery pack housing, at least one cell holder, the cell holder including at least one rechargeable battery cell, and a rechargeable battery pack electronics system that includes a flexible circuit board.

SUMMARY

The present invention relates to a rechargeable battery pack, in particular a rechargeable battery pack for a hand-held power tool. In accordance with an example embodiment of the present invention, the rechargeable battery pack includes a housing that includes a cell housing in which at least one rechargeable battery cell is accommodated via an axial opening, the cell housing including at least one radial opening via which the at least one rechargeable battery cell is contactable. It is provided that a sealing element that seals off the radial opening is situated in the area of the at least one radial opening. The service life of the rechargeable battery pack may advantageously be extended in this way.

The rechargeable battery pack is in particular part of a system made up of the rechargeable battery pack and a consumer, the consumer being supplied with energy via the rechargeable battery pack during operation. The rechargeable battery pack is in particular designed as a replaceable rechargeable battery pack. The rechargeable battery pack in particular is designed to be connectable to a charging device for charging the rechargeable battery pack. The housing of the rechargeable battery pack is in particular designed as an outer housing. The rechargeable battery pack, in particular the housing of the rechargeable battery pack, is detachably connectable to the consumer and/or the charging device via a mechanical interface. The housing of the rechargeable battery pack may include one or multiple housing parts, the cell housing being one of these housing parts. The housing parts are connected to one another in a force-fit, form-fit, and/or integrally joined manner. The mechanical interface of the rechargeable battery pack is in particular provided for a system made up of a rechargeable battery pack and a consumer, in which the weight proportion of the rechargeable battery pack is at least ⅛ of the total weight, preferably at least ¼ of the total weight, more preferably at least ⅓ of the total weight. With such weight ratios, due to the high weight of the rechargeable battery pack and the inertia of the rechargeable battery pack, very high stress on the mechanical connection may occur if the system is dropped, which may result in nonreversible damage to the mechanical interface.

The consumer may in particular be designed as a garden tool, for example a lawn mower or a hedge trimmer, as a household appliance, for example an electric window cleaner or a hand-held vacuum, as a hand-held power tool, for example an angle grinder, a screwdriver, a drill, a hammer drill, etc., or as a measuring tool, for example a laser distance measuring device. In addition, it is also possible for the consumer to be designed as some other in particular portable device, for example as a jobsite light, a suction device, or a jobsite radio. The rechargeable battery pack is connectable to the consumer in a force-fit and/or form-fit manner via the mechanical interface. The mechanical interface advantageously includes at least one actuating element via which the connection of the rechargeable battery pack to the consumer and/or to the charging device is detachable. The actuating element may be designed as a knob, lever, or push button, for example. In addition, the rechargeable battery pack includes at least one electrical interface via which the rechargeable battery pack is electrically connectable to the consumer and/or to the charging device. The rechargeable battery pack may be charged and/or discharged, for example, via the electrical connection. Alternatively or additionally, it is also possible that information is transmittable via the electrical interface. The electrical interface is preferably designed as a contact interface in which the electrical connection takes place via a physical contact of at least two conductive components. The electrical interface preferably includes at least two electrical contacts. In particular, one of the electrical contacts is designed as a positive contact and the other electrical contact is designed as a negative contact. Alternatively or additionally, the electrical interface may include a secondary charging coil element for inductive charging. Furthermore, the at least one rechargeable battery cell, which is electrically connectable to the consumer via the electrical contact device, is situated in the housing of the rechargeable battery pack. The rechargeable battery cell may be designed as a galvanic cell having a design in which one cell pole comes to rest at one end, and a further cell pole comes to rest at an opposite end. In particular, the rechargeable battery cell includes a positive cell pole at one end and a negative cell pole at an opposite end. The rechargeable battery cells are preferably designed as NiCd or NiMh, particularly preferably as lithium-based, rechargeable battery cells or Li-ion rechargeable battery cells. The rechargeable battery voltage of the rechargeable battery pack is generally a multiple of the voltage of an individual rechargeable battery cell, and results from the circuit (parallel or serial) of the rechargeable battery cells. In common rechargeable battery cells having a voltage of 3.6 V, this results in a rechargeable battery voltage, for example, of 3.6 V, 7.2 V, 10.8 V, 14.4 V, 18 V, 36 V, 54 V, 108 V, etc. The rechargeable battery cell is preferably designed as an at least essentially cylindrical round cell, the cell poles being situated at ends of the cylindrical shape. In addition, the electrical interface may include at least one further contact that is designed to transmit additional information to the consumer and/or to the charging device. The rechargeable battery pack preferably includes an electronics system, it being possible for the electronics system to include a memory unit on which the information is stored. Additionally or alternatively, it is likewise possible that the information is ascertained by the electronics system. The information may be, for example, a state of charge of the rechargeable battery pack, a temperature within the rechargeable battery pack, a coding, or a residual capacity of the rechargeable battery pack. It is also possible for the electronics system to be designed to regulate or control the charging and/or discharging operation of the rechargeable battery pack. The electronics system may include a circuit board, a processing unit, a control unit, a transistor, a capacitor, and/or the memory unit, for example. The electronics system may also include one or multiple sensor elements, for example a temperature sensor for ascertaining the temperature within the rechargeable battery pack. The electronics system may alternatively or additionally include a coding element, for example a coding resistor.

The cell housing is preferably designed, at least in part, as an outer housing part. The cell housing includes at least one receiving area for the at least one rechargeable battery cell. The cell housing includes in particular multiple receiving areas in which a single or multiple rechargeable battery cell(s) is/are situated in each case. Preferably all rechargeable battery cells of the rechargeable battery pack are individually accommodated in receiving areas of the cell housing. The cell housing preferably has a one-piece design. The cell housing is preferably made of a plastic, for example high-density polyethylene (HDPE). In particular, the cell housing includes at least one axial opening for each receiving area. In this regard, an "axial opening" is understood to mean in particular an opening of the cell housing that is intersected by a longitudinal axis of at least one rechargeable battery cell situated in the receiving area. In particular, the axial opening extends essentially perpendicularly with respect to the longitudinal axis of at least one rechargeable battery cell situated in the receiving area. The axial opening is in particular designed as a receiving opening via which the rechargeable battery cell is insertable or receivable in the cell housing. The cell housing preferably includes an axial opening for each rechargeable battery cell that is accommodatable therein. The axial opening is situated in particular on the same side of the cell housing. It is likewise possible for the axial openings of the cell housing to be situated on different, preferably opposite, sides. The radial opening is situated in particular on a side that is different from the side on which the axial opening is situated. The radial openings preferably extend in at least one direction essentially in parallel to the longitudinal axis of the rechargeable battery cell situated in the receiving area. The receiving areas may have no, one, or multiple axial opening(s). The radial opening is in particular designed as a single cell monitoring opening. A single cell monitoring opening is understood in particular to mean an opening via which an electrical contact may electrically contact an individual rechargeable battery cell of an array of rechargeable battery cells, for example to ascertain the voltage of the individual rechargeable battery cell. Alternatively or additionally, it is possible for the radial opening to be designed as a temperature monitoring opening via which the temperature of the rechargeable battery cell is ascertainable with the aid of a temperature sensor. The receiving area is in particular delimited by a wall of the cell housing. In particular, the cell housing includes a wall for each receiving area, the walls having a one-piece design with one another. The wall is interrupted by the axial opening and the radial opening. The shape of the wall is preferably adapted, at least in part, to the shape of the rechargeable battery cell situated in the receiving area. The wall includes in particular an inner side against which the rechargeable battery cell at least partially, in particular completely, rests. The inner side of the wall preferably has a cylindrical design. The rechargeable battery cell situated in the receiving area preferably includes an electrically conductive, preferably metallic, outer shell in the area of the radial opening. The sealing element is in particular designed to protect the radial opening from entry of conductive or abrasive particles or dust. The sealing element is preferably made of an elastic or flexible plastic material. In particular, the rechargeable battery pack includes at least one sealing element for each radial opening, the sealing elements preferably having a one-piece design with one another. The at least one sealing element is situated in particular outside the receiving area, preferably completely outside the receiving area.

Furthermore, in accordance with an example embodiment of the present invention, it is provided that the rechargeable battery pack includes a sealing element carrier made up of at least two components, at least one component being made of a hard plastic and at least one component being made of a soft plastic, and the sealing element being designed as the soft plastic component. The installation of the rechargeable battery pack may advantageously be improved in this way. The sealing element carrier is preferably manufactured via a two-component injection molding process. In particular, the sealing element carrier is connected to the housing in a force-fit and/or form-fit or integrally joined manner. The connection between the sealing element carrier and the housing preferably takes place via the hard plastic component. The sealing element carrier is preferably designed as an individual component. In particular, the sealing element carrier includes at least two hard plastic components that are movably connected to one another via the soft plastic component. In particular, the hard plastic component has a greater rigidity and/or hardness than the soft plastic component. The soft plastic component may preferably be bent and/or deformed with a smaller force than the hard plastic component. The soft plastic component is preferably made of an elastic plastic or a rubber.

Moreover, in accordance with an example embodiment of the present invention, it is provided that on a side on which the radial opening is situated, the rechargeable battery cell is at least partially enclosed by the cell housing and a further outer housing part via a double wall. The protection of the radial opening may advantageously be further improved in this way. In particular, the outer housing part is connected to the cell housing in a force-fit and/or form-fit manner. A straight line that extends orthogonally with respect to the longitudinal axis of the rechargeable battery cell situated in the receiving area preferably initially intersects the radial opening and then the outer housing part, starting from the longitudinal axis.

In addition, in accordance with an example embodiment of the present invention, it is provided that the sealing element carrier is situated between the cell housing and the further outer housing part, in particular connected to the cell housing and/or the further outer housing part, in a force-fit and/or form-fit manner. The installation is advantageously simplified in this way.

Furthermore, in accordance with an example embodiment of the present invention, it is provided that the sealing element carrier includes at least one positioning means (i.e., a positioning element). The installation is advantageously further simplified in this way. The positioning means is preferably designed as a guide element with the aid of which the sealing element carrier is guided during the connection to the housing. The housing of the rechargeable battery pack, in particular the cell housing and/or the further outer housing part, include(s) at least one corresponding positioning means that is designed for the form-fit connection to the positioning means of the sealing element carrier. The form fit between the positioning means acts in particular in at least two opposite directions. The positioning means are preferably designed in one piece with the sealing element carrier or the housing.

In addition, in accordance with an example embodiment of the present invention, it is provided that the cell housing is situated between the at least one rechargeable battery cell and an electronics system, the electronics system being connected to the rechargeable battery cell via the at least one radial opening. In this way the electronics system may advantageously be connected to the at least one rechargeable battery cell, for example for single cell monitoring, as the result of which the control of the rechargeable battery pack may be improved. In particular, the cell housing is situated only partially, and not completely, between the rechargeable battery cell and the electronics system. The wall of a receiving area of the cell housing is preferably situated between the rechargeable battery cell and the electronics system. In particular, the electronics system is connected to the at least one rechargeable battery cell via the at least one radial opening with the aid of at least one contact element. The contact element is in particular designed as an electrical contact element and is electrically connected to the rechargeable battery cell. In particular, the contact element rests against the circumferential surface of the rechargeable battery cell.

Moreover, in accordance with an example embodiment of the present invention, it is provided that the electronics system includes a first circuit board and a second circuit board, the sealing element carrier being situated between the circuit boards. In particular, the first circuit board is designed as a flexible circuit board. The second circuit board is preferably designed as an inflexible circuit board.

The at least one contact element is preferably connected to the first circuit board or formed in one piece with it. The flexible circuit board may, for example, be made at least partially of a laminated copper strip, the contact elements being formed by the copper strip.

Furthermore, in accordance with an example embodiment of the present invention, it is provided that the first circuit board and the second circuit board are connected to one another via a plug-in connection. In particular, the first circuit board includes a plug and the second circuit board includes a socket, or vice versa. Alternatively, it is likewise possible for the first and the second circuit boards to each include a socket that is connectable via a separate plug, for example designed as a cable. The flexible circuit board is preferably essentially completely covered by the sealing element carrier, as the result of which the mechanical stability is advantageously increased.

In addition, in accordance with an example embodiment of the present invention, it is provided that the electronics system, in particular the first and/or the second circuit board(s), have/has a display unit that is covered on the outside via the hard plastic component of the sealing element carrier. In particular, the hard plastic component has a transparent design. The display unit is in particular designed for reproducing information. The display unit preferably includes at least one display element, or a lighting element that is designed as an LED, for example. The display unit may be designed, for example, as a state of charge display via which a state of charge of the rechargeable battery pack is displayable. A "transparent" hard plastic component is understood in particular to mean a light-permeable hard plastic component. The hard plastic component preferably has a transparent design such that the color of the light remains essentially unchanged when passing through the hard plastic component.

Furthermore, in accordance with an example embodiment of the present invention, it is provided that the electronics system, in particular the first and/or the second circuit board, include(s) an actuating element that is covered on the outside via the soft plastic component of the sealing element carrier. It is thus advantageously possible to effectively protect the rechargeable battery pack from entry of dust in the area of the actuating element. The actuating element is in particular designed for manually controlling the electronics system, preferably for controlling the state of charge display. The actuating element is preferably situated on the first circuit board. The actuating element may be designed as a knob, as a switch, or as a push button, for example.

Moreover, the present invention relates to a rechargeable battery pack, in particular a rechargeable battery pack for a hand-held power tool, including a housing in which at least one rechargeable battery cell is situated, and including an electrical interface that is designed for connecting the rechargeable battery pack to a consumer, the electrical interface being connected to at least one rechargeable battery cell via an electrical contact device. In accordance with an example embodiment of the present invention, it is provided that the electrical contact device includes a tubular conductor. Particularly good heat output or heat distribution is advantageously achieved in the rechargeable battery pack by the use of a tubular conductor. The tubular conductor is in particular designed as a metallic tube. The tubular conductor may have an essentially circular or an essentially rectangular cross section. The tubular conductor is preferably made of a copper alloy, copper, or oxygen-free copper. The tubular conductor is preferably manufactured as an individual component, more preferably from a single piece.

Furthermore, in accordance with an example embodiment of the present invention, it is provided that the electrical interface includes at least two power contacts that are designed for connection to two corresponding power contacts of a consumer, at least one of the power contacts being connected to the rechargeable battery cell via the electrical contact device. During operation of the consumer, power from the rechargeable battery pack is provided via the power contacts; i.e., the electrical current flows for supplying power to the consumer. The power contacts of the rechargeable battery pack and the power contacts of the consumer are preferably designed in such a way that they are connectable to one another via a plug-in connection.

In addition, in accordance with an example embodiment of the present invention, it is provided that the tubular conductor includes a first end at which the tubular conductor is connected to a fuse element. The fuse element advantageously protects the electronics system of the rechargeable battery pack, for example in the event of a short circuit. The fuse element is in particular designed as an electrical fuse element. The fuse element is in particular designed in such a way that in the event of triggering, for example in the case of a short circuit, the fuse element is destroyed, thus requiring replacement. The fuse element may be designed as a safety fuse, for example. The fuse element preferably has a cylindrical shape. The fuse element preferably includes a ceramic sleeve in which a wire fuse is situated.

Moreover, in accordance with an example embodiment of the present invention, it is provided that a diameter of the tubular conductor at the first end is adapted to the fuse element, in particular increased, in such a way that the fuse element is accommodatable in an expanded area. In this way the tubular conductor may advantageously be easily and securely connected to the fuse element. The connection of the tubular conductor to the fuse element preferably takes place via a force-fit and/or form-fit connection, preferably by pressing the first end of the tubular conductor onto the fuse element. In particular, an inner diameter of the first end of the tubular conductor prior to or after installation essentially corresponds to an outer diameter of the fuse element.

Furthermore, in accordance with an example embodiment of the present invention, it is provided that the tubular conductor includes a second end at which the tubular conductor is connected, preferably integrally joined, to the rechargeable battery cell, in particular via a cell connector. The integral bond may take place via welding or soldering, for example. In particular, a resistance welding method with the aid of hard solder is possible. In this regard, a cell connector is understood in particular to mean a metallic component that is preferably integrally joined to one of the cell poles of at least one rechargeable battery cell, in each case preferably integrally joined to one of the cell poles of at least two rechargeable battery cells.

In addition, in accordance with an example embodiment of the present invention, it is provided that the tubular conductor is bent and/or flattened at its second end. The installation of the tubular conductor or the connection to the rechargeable battery cell may advantageously be improved or simplified in this way. In particular, the tubular conductor has a bent design at its second end such that the distance between the second end of the tubular conductor and the rechargeable battery cell or the cell connector is reduced. The tubular conductor is preferably bent at its second end in the direction of the rechargeable battery cells and/or in the direction of the nearest side of the cell housing that includes axial openings. In this regard, a "flattened" end is understood in particular to mean that the shape of the tubular conductor at its second end is changed in such a way that the height of the tubular conductor at the second end is less than the diameter at the first end of the tubular conductor. In particular, the tubular conductor at the second end is flattened in such a way that two oppositely situated tube walls rest against one another. It is thus advantageously possible to simplify the integral joining of the tubular conductor to the rechargeable battery cell or to the cell connector. In particular, the tubular conductor at its first end encompasses a larger cavity than at its second end.

Furthermore, in accordance with an example embodiment of the present invention, it is provided that the tubular conductor has a minimum cross-sectional area of at least 8 $mm^2$, preferably at least 10 $mm^2$, more preferably at least 15 $mm^2$. It may thus be advantageously ensured that sufficient current may be provided for supplying power to the consumer. In particular, the cross-sectional area of the tubular conductor is essentially constant over the length of the tubular conductor.

In addition, in accordance with an example embodiment of the present invention, it is provided that a heat storage element is situated within the tubular conductor. The heat generation within the rechargeable battery pack may advantageously be better controlled in this way. The heat storage element is situated in particular in the cavity of the tubular conductor. The heat storage element preferably fills the cavity of the tubular conductor at least partially, preferably completely. The heat storage element may be made of a solid and/or a liquid. In particular, the heat storage element has a high heat capacity of at least 1.1 $J/(g*K)$, preferably at least 1.5 $J/(g*K)$, more preferably at least 2.0 $J/(g*K)$. It is likewise possible for the heat storage element to be made of a material whose state of aggregation changes during operation in order to absorb a preferably large amount of heat. The heat storage element may be made, for example, of a plastic such as HDPE.

Moreover, the present invention relates to a method for manufacturing an electrical contact device. In accordance with an example embodiment of the present invention, the method includes the following steps:

manufacturing of a metal tube, in particular a copper tube;
cutting the metal tube;
crimping the metal tube onto a fuse element;
flattening the metal tube;
welding the flattened area of the metal tube to a conductor element or a cell connector.

Moreover, the present invention relates to a rechargeable battery pack, in particular a rechargeable battery pack for a hand-held power tool, including a housing in which at least one rechargeable battery cell is accommodated. In accordance with an example embodiment of the present invention, it is provided that the rechargeable battery pack includes at least one protective element that is connected to the housing. It is thus advantageously possible to effectively protect the rechargeable battery pack, in particular the rechargeable battery cells situated in the rechargeable battery pack, in the event of a fall. The protective element is in particular designed to locally reinforce the housing of the rechargeable battery pack, preferably the cell housing of the rechargeable battery pack.

In addition, in accordance with an example embodiment of the present invention, it is provided that the protective element is connected to the housing in a force-fit and/or form-fit manner. Alternatively, it is also possible for the protective element to be integrally joined, for example glued, to the housing. In particular, the protective element has a greater hardness and/or strength than the housing or the housing part to which it is connected. Effective reinforcement of the housing may thus advantageously be achieved. The protective element may be made of a plastic and/or a metal. In particular, the protective element is electrically insulated from the current-conducting components of the rechargeable battery pack, for example the electrical contact elements, via the housing. The protective element is preferably formed from a metal sheet. The metal sheet may have a flat or bent design. In particular, the protective element has a greater rigidity than the surrounding housing, in particular a rigidity that is at least ten times greater than the surrounding housing. "Hardness" is understood in particular to mean a mechanical resistance of a material or of a component to a mechanical penetration by another body. "Rigidity" is understood in particular to mean a resistance of a material to deformation and separation.

Furthermore, in accordance with an example embodiment of the present invention, it is provided that the rechargeable battery cells include an in particular metallic cell jacket, and the protective element has a greater wall thickness than the cell jacket of the rechargeable battery cell. It is thus advantageously possible to effectively protect the rechargeable battery cell from deformation in the event of a fall.

Moreover, in accordance with an example embodiment of the present invention, it is provided that the at least one rechargeable battery cell is situated in a cell housing, the protective element being situated inside and/or outside the cell housing. In particular, the cell housing includes at least one receiving area for the at least one rechargeable battery cell, the receiving area being delimited by a wall against whose inner side the rechargeable battery cell rests, and against whose outer side the protective element rests. Alternatively, it is also possible for the protective element to rest against the inner side of the wall. The curvature of the wall and/or of the protective element is preferably essentially circular.

In addition, in accordance with an example embodiment of the present invention, it is provided that the wall, in particular the wall and the protective element, is/are adapted, at least in part, to the outer contour of the rechargeable battery cell. A compact design of the rechargeable battery pack may be advantageously achieved in this way. In particular, the wall and/or the protective element have/has a curvature that is adapted to the outer contour of the rechargeable battery cell or to the cell jacket of the rechargeable battery cell. In particular, the wall, preferably the wall and the protective element, has/have an at least partially curved, preferably circular, cross section.

Furthermore, in accordance with an example embodiment of the present invention, it is provided that the protective element is situated around the rechargeable battery cell in an angular range between 60° and 180°. In particular, an individual protective element is situated around an individual rechargeable battery cell in an angular range between 60° and 180°. The angular range extends in the circumferential direction of the rechargeable battery cell. Alternatively, it is also possible for the angular range to be between 80° and 120° or between 130° and 160°.

In addition, in accordance with an example embodiment of the present invention, it is provided that the protective element is made of a metallic material, in particular steel, titanium, or aluminum. In this way, sufficient strength and/or hardness may advantageously be achieved to effectively protect the rechargeable battery pack.

Moreover, in accordance with an example embodiment of the present invention, it is provided that the protective element is situated at least partially, in particular completely, within the housing. In particular, the protective element is situated in a receiving pocket of the cell housing, in particular fastened in the cell housing in a force-fit manner in a receiving pocket of the cell housing. The receiving pocket for the protective element is preferably situated outside the receiving area for the rechargeable battery cell.

Furthermore, in accordance with an example embodiment of the present invention, it is provided that the cell housing includes at least two oppositely situated receiving pockets. The two oppositely situated receiving pockets are preferably situated in such a way that the protective elements situated in the receiving pockets protect the same rechargeable battery cell. The protection of the rechargeable battery cells may advantageously be further improved in this way.

Moreover, in accordance with an example embodiment of the present invention, it is provided that at least one rechargeable battery cell, preferably at least two rechargeable battery cells, is/are protected by the at least one protective element along at least 50%, preferably along at least 75%, more preferably along at least 90%, of a length of the rechargeable battery cell. In particular, the protective element is situated in the area of an edge of the rechargeable battery pack that preferably extends in parallel to a longitudinal extension of the at least one rechargeable battery cell.

In addition, in accordance with an example embodiment of the present invention, it is provided that the protective element is situated spaced apart from the mechanical interface of the rechargeable battery pack, in particular on a side of the rechargeable battery pack opposite from the mechanical interface. The rechargeable battery pack is thus advantageously protected in the area in which the greatest force impacts on the rechargeable battery pack in the event of a fall. In particular, the distance between the mechanical interface of the rechargeable battery pack and the protective element is at least one diameter or one width of the rechargeable battery cell, preferably at least twice the diameter or twice the width of the rechargeable battery cell, more preferably at least one length of the rechargeable battery cell.

Furthermore, in accordance with an example embodiment of the present invention, it is provided that the protective element is coupled to an energy absorption element, the energy absorption element being designed in such a way that the energy absorption element under the action of force penetrates at least partially into the housing, preferably into the cell housing. In particular, the protective element and the energy absorption element have a one-piece design. The protection of the rechargeable battery cells may advantageously be further improved by the energy absorption element. The energy absorption element is in particular designed to absorb energy that acts on it by effectuating a deformation of the housing, in particular the cell housing. The energy absorption element is preferably designed as toothing. The toothing is situated in particular at the edge of the protective element. The toothing has at least one tooth element, the tooth element preferably having at least one sharp edge.

Moreover, the present invention relates to a system made up of a rechargeable battery pack and a hand-held power tool, the housing of the rechargeable battery pack in the connected state partially forming the outer surface of the system. In accordance with an example embodiment of the present invention, it is provided that the protective element is situated between an area of the rechargeable battery pack that forms the outer surface of the system, and at least one rechargeable battery cell. It is thus advantageously possible to effectively protect the rechargeable battery cells situated in the rechargeable battery pack in the event of a fall of the system.

Moreover, the present invention relates to a rechargeable battery pack, in particular a rechargeable battery pack for a hand-held power tool, including a housing and including a mechanical interface for detachably connecting the rechargeable battery pack to a consumer. In accordance with an example embodiment of the present invention, it is provided that the mechanical interface includes at least one predetermined breaking point that is designed in such a way that a break occurs in the event of an overload of the mechanical interface in the area of the predetermined breaking point. Damage to the rechargeable battery pack caused by the overload may thus be advantageously controlled. The overload on the mechanical interface may arise, for example, during a heavy pulse-like action of force, for example during a fall of the rechargeable battery pack or of the system made up of the rechargeable battery pack and the consumer. Likewise, it is possible for the overload to occur after a preceding weakening of the mechanical interface, for example due to wear.

Furthermore, in accordance with an example embodiment of the present invention, it is provided that the mechanical interface includes at least one retaining element on which a weight of the rechargeable battery pack acts at least partially, in particular completely, during operation, the predetermined breaking point being situated in the area of the retaining element. In particular, the retaining element is designed as a guide element, preferably as a guide rail. A particularly effective predetermined breaking point may advantageously be implemented in this way.

In addition, in accordance with an example embodiment of the present invention, it is provided that the housing of the rechargeable battery pack includes an outer surface and an inner surface, the predetermined breaking point being designed in such a way that the inner surface remains essentially unchanged in the event of damage. It may thus be advantageously ensured that the electronics system accommodated in the rechargeable battery pack and the accommodated rechargeable battery cell are protected.

Moreover, in accordance with an example embodiment of the present invention, it is provided that the predetermined breaking point is designed in such a way that in the event of damage or in the event of a triggering of the predetermined breaking point, the at least one retaining element, in particular the at least one guide rail, breaks off in such a way that the rechargeable battery pack is not connectable to a consumer. The use of a damaged rechargeable battery pack may advantageously be prevented in this way. In particular, the proper functioning of the mechanical interface is no longer provided after triggering of the predetermined breaking point.

Furthermore, in accordance with an example embodiment of the present invention, it is provided that the predetermined breaking point has a length that corresponds to at least 25% of the length of the retaining element, in particular at least 50% of the length of the retaining element, preferably at least 75% of the length of the retaining element. It is thus advantageously possible for the mechanical interface to be torn by the predetermined breaking point, and to automatically tear further due to the overload. Alternatively, it is also possible for the length of the predetermined breaking point to essentially correspond to the length of the retaining element.

In addition, in accordance with an example embodiment of the present invention, it is provided that the predetermined breaking point extends linearly, in particular in parallel to a connection direction of the rechargeable battery pack. A connection direction is understood in particular to mean the direction in which the rechargeable battery pack is inserted into the consumer or pushed onto the consumer.

Furthermore, in accordance with an example embodiment of the present invention, it is provided that the housing includes a predetermined breaking point element that is formed as a cavity and/or from a material that is different from the housing, in particular a plastic or a metal. A weakening of the housing, in particular of the mechanical interface, is advantageously introduced by the predetermined breaking point element. The material of the predetermined breaking point element is preferably designed in such a way that it has a low adhesion to the material of the housing, in particular the material of the mechanical interface of the housing. In particular, the predetermined breaking point element is designed as a bracket, in particular a metal bracket. Alternatively, it is also possible for the predetermined breaking point element to have a plate-shaped or bar-shaped design.

Moreover, in accordance with an example embodiment of the present invention, it is provided that the predetermined breaking point element is situated at least partially, in particular completely, within the retaining element, in particular within the guide rail. The predetermined breaking point element is preferably surrounded by the retaining element on at least two sides, preferably on at least two opposite sides, particularly preferably on at least three sides. Alternatively, it is also possible for the predetermined breaking point element to be completely surrounded, or completely surrounded except on one side, by the retaining element. In particular, the predetermined breaking point element has a design that is integrated into the housing. In particular, the housing is connected to the predetermined breaking point element in a force-fit and/or form-fit manner. The housing together with the predetermined breaking point element is preferably manufactured via a multicomponent injection molding process.

Furthermore, in accordance with an example embodiment of the present invention, it is provided that the predetermined breaking point is situated in the area between the predetermined breaking point element and the outer surface of the rechargeable battery pack, with a shortest distance from a top side or a bottom side of the guide rail.

In addition, in accordance with an example embodiment of the present invention, it is provided that the rechargeable battery pack includes a wear protection element. In particular, the predetermined breaking point element and the wear protection element have a one-piece design. Two different functions may thus advantageously be fulfilled by the predetermined breaking point element. Alternatively, it is also possible for the wear protection element to be designed as a component that is separate from the predetermined breaking point element. In particular, the wear protection element and the retaining element or the guide rail are manufactured or connected to one another with the aid of a two-component injection molding process. The wear protection element forms in particular a sliding surface of the guide rail of the rechargeable battery pack, along which the housing of the hand-held power tool or a corresponding guide rail of the hand-held power tool slides during the connection process with the hand-held power tool. The wear protection element preferably has a greater hardness and/or rigidity than the retaining element or the housing of the rechargeable battery pack. The wear protection element is preferably made of metal, preferably steel.

BRIEF DESCRIPTION OF THE DRAWINGS

Further advantages result from the following description of the figures. The figures and the description contain numerous features in combination. Those skilled in the art will also advantageously consider the features individually and combine them into further meaningful combinations. Reference numerals of features of different specific embodiments of the present invention that essentially correspond to one another are provided with the same number, and with a letter that indicates the specific embodiment.

DETAILED DESCRIPTION OF EXAMPLE EMBODIMENTS

Figure 1:
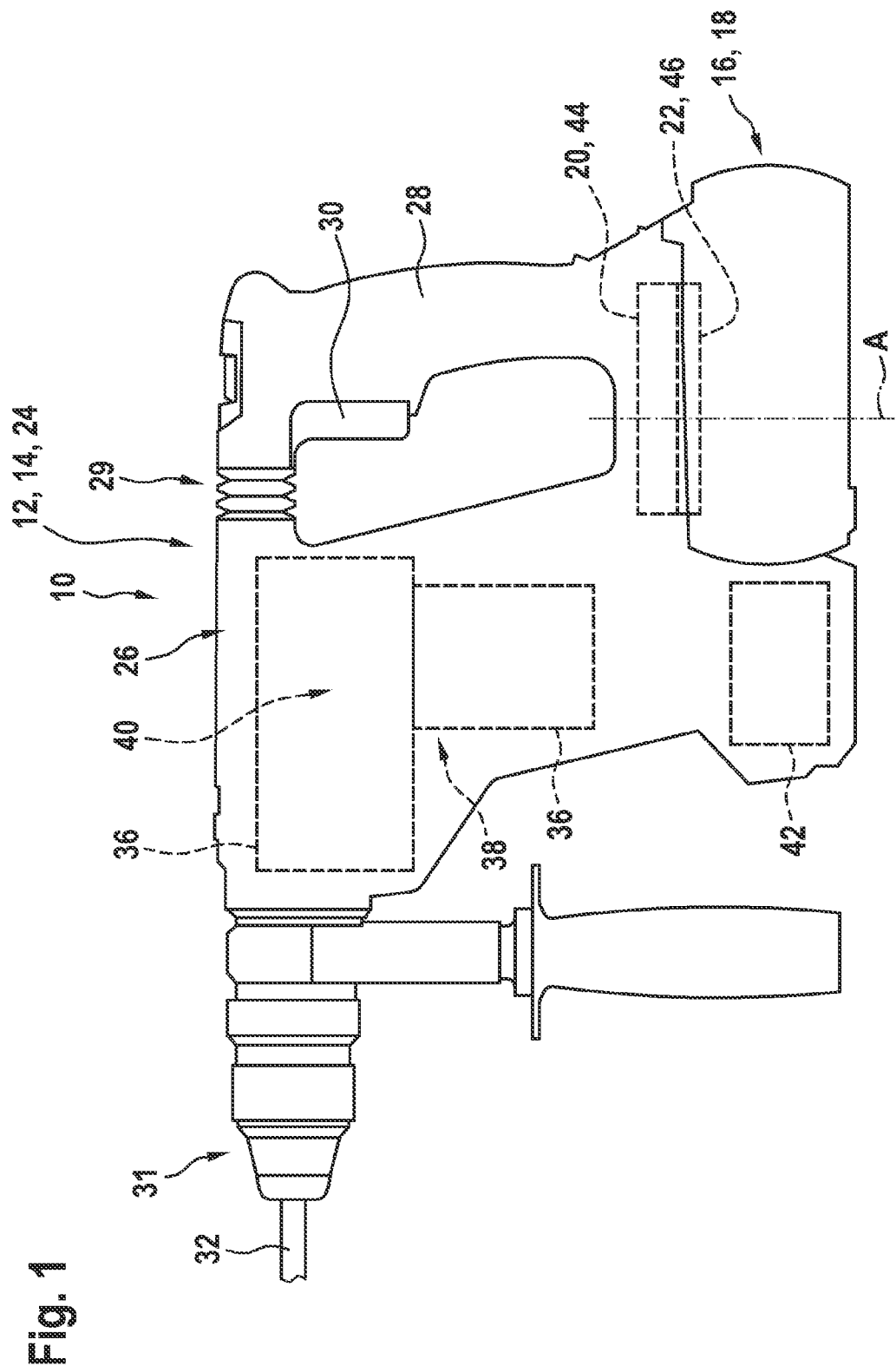
FIG. 1 shows a side view of a system made up of a hand-held power tool and a rechargeable battery pack according to an example embodiment of the present invention.

FIG. 1 shows a side view of a system 10 made up of a consumer 14, designed as a hand-held power tool 12, and a rechargeable battery pack 18 designed as a hand-held power tool rechargeable battery pack 16. The hand-held power tool is thus designed as a rechargeable battery hand-held power tool, and during operation is supplied with power via rechargeable battery pack 18. Hand-held power tool 12 and rechargeable battery pack 18 include a mechanical interface 20, 22, respectively, via which the two components of system 10 are detachably connected to one another.

Rechargeable battery pack 18 is thus designed as a replaceable rechargeable battery pack, and may be replaced by an identical or similar rechargeable battery pack. Hand-held power tool 12 is designed as a hammer drill 24 by way of example. Hand-held power tool 12 includes a housing 26, at the rear end of which a handle 28 with an operating switch 30 for switching hand-held power tool 12 on and off is situated. A tool holder 31 that is provided for holding an insertion tool 32 is situated at the front end of housing 26 of hand-held power tool 12. A drive unit 38 that includes an electric motor 34 and a gear 36 is situated between handle 28 and tool holder 31. Gear 36 includes a striking mechanism unit 40, and is situated above electric motor 34. Striking mechanism unit 40 includes a pneumatic striking mechanism. The striking mechanism may be designed as an eccentric striking mechanism or as a wobble mechanism, for example. An electronics system 42 via which hand-held power tool 12 is regulatable or controllable is situated below electric motor 34. Rechargeable battery pack 18 is situated below handle 28 and adjacent to electronics system 42. Handle 28 is connected, via a vibration damping unit 29, to the area of housing 26 that includes drive unit 38, so that the vibrations arising from striking mechanism unit 40 are conveyed in a damped manner to handle 28 and also conveyed in a damped manner to mechanical interfaces 20, 22 of hand-held power tool 12 and of rechargeable battery pack 18. Handle 28 is thus designed as a vibration-decoupled handle. Rechargeable battery pack 18 and consumer 14 include mutually corresponding electrical interfaces 44, 46, respectively, via which rechargeable battery pack 18 is electrically connectable to consumer 14, in particular to electronics system 42 of consumer 14. In the connected state, rechargeable battery pack 18 provides the power supply for consumer 14. Rechargeable battery pack 18 has a weight corresponding to approximately one-fourth of the total weight of system 10. The weight and the arrangement of rechargeable battery pack 18 result in an increased load in the area of mechanical interfaces 20, 22 during operation of system 10.

Figure 2:
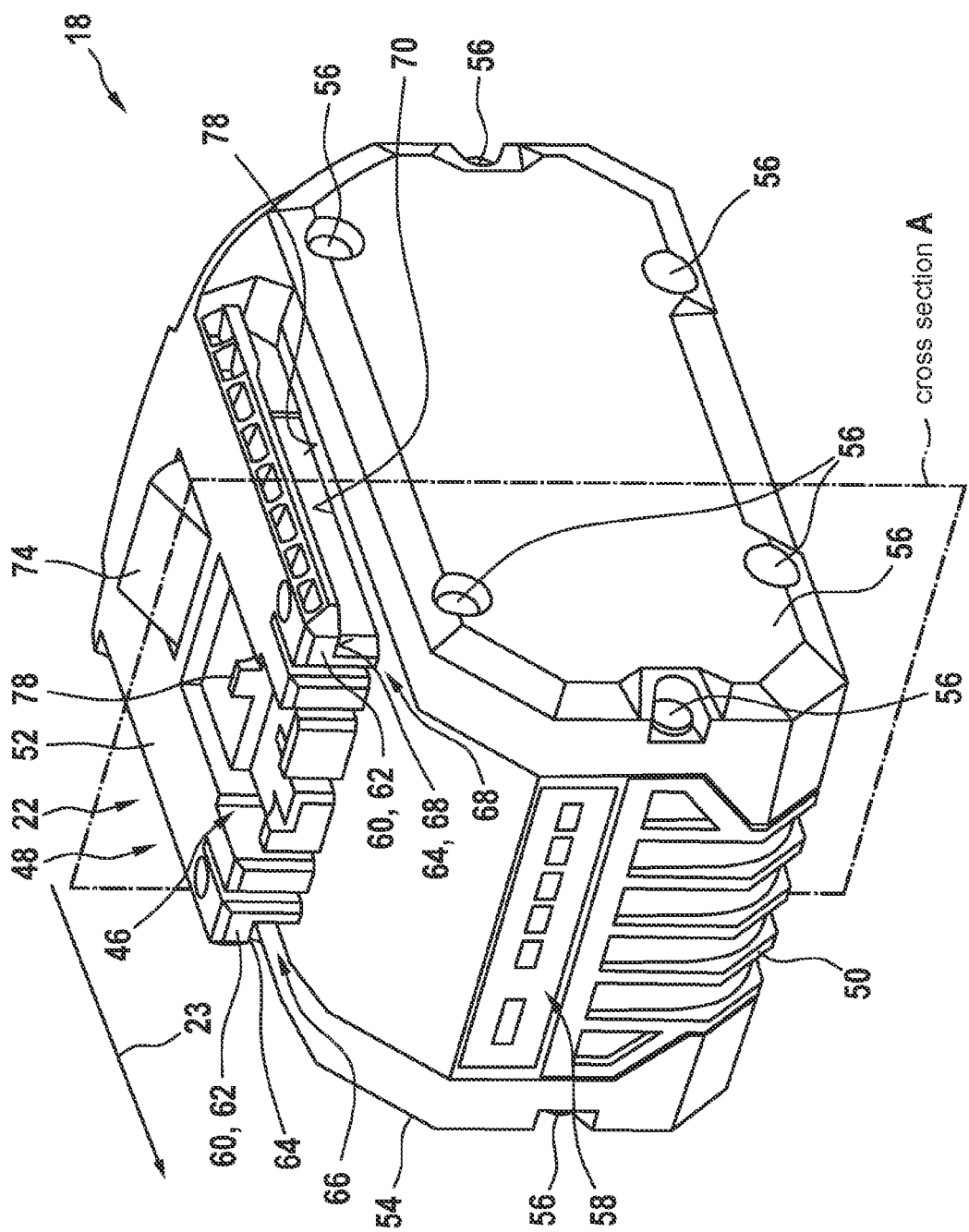
FIG. 2 shows a perspective view of the rechargeable battery pack.

FIG. 2 shows rechargeable battery pack 18 together with mechanical interface 22 in a perspective view. Rechargeable battery pack 18 is detachably mechanically connected to consumer 14 via mechanical interface 22. Rechargeable battery pack 18 includes a housing 48 having a multipart design by way of example. Housing 48 is made of a plastic-containing housing material. Housing 48 is preferably made of a polycarbonate or a high-density polyethylene (HDPE). Housing 48 is in particular designed as an outer housing. Housing 48 includes a cell housing 50, an interface housing part 52, and two side housing parts 54. Housing parts 50, 52, 54 are connected to one another via fastening elements 56 that are designed as screws by way of example. Housing parts 50, 52, 54 are all designed, at least in part, as outer housing parts.

A state of charge display 58 via which the state of charge of rechargeable battery pack 18 is displayable is situated on the front side of rechargeable battery pack 18. Housing 48 of rechargeable battery pack 18, in particular interface housing part 52, includes mechanical interface 22 and electrical interface 46.

Rechargeable battery pack 18 is designed as an insertable rechargeable battery pack by way of example. For connection to hand-held power tool 12, rechargeable battery pack 18 is pushed onto hand-held power tool 12 along a connection direction 23.

Mechanical interface 22 includes a pair of retaining elements 60 at which rechargeable battery pack 18 is retained in the state connected to hand-held power tool 12. Retaining elements 60 are designed as guide rails 62 by way of example. Retaining elements 60 extend essentially in parallel to connection direction 23 of rechargeable battery pack 18. Retaining elements 60 or guide rails 62 each include a sliding surface 64 along which housing 48 of rechargeable battery pack 18 slides during the connection to housing 26 of hand-held power tool 12. In the state connected to hand-held power tool 12, guide rails (not illustrated) of mechanical interface 20 of hand-held power tool 12 rest against sliding surfaces 64 of guide rails 62. In the state connected to hand-held power tool 12, in particular during operations in which hand-held power tool 12 is not guided in parallel to the effective direction of the weight force of rechargeable battery pack 18, essentially the entire weight force of rechargeable battery pack 18 thus acts on retaining elements 60 or guide rails 62 of mechanical interface 22 via sliding surfaces 64. In addition, mechanical interface 22 of rechargeable battery pack 18 includes a pair of guide grooves 66. In the state connected to hand-held power tool 12, the guide rails of hand-held power tool 12 are situated in guide grooves 66. Guide grooves 66 are situated adjoining retaining elements 60 or guide rails 62. Guide grooves 66 are spanned by an upper wall surface 68, a side wall 70, and a lower wall surface 72. In particular, upper wall surface 68 of guide groove 66 corresponds to sliding surface 64 of retaining element 60. In one direction, wall surfaces 68, 70, 72 of guide grooves 66 extend in parallel to connection direction 23 of rechargeable battery pack 18, and in another direction extend perpendicularly or in parallel to one another. In addition, mechanical interface 22 of rechargeable battery pack 18 includes a locking element 74. Locking element 74 is movably, in particular rotatably movably, supported in housing 48 of rechargeable battery pack 18. Locking element 74 is designed for locking rechargeable battery pack 18 to hand-held power tool 12 in the connected state. Locking element 74 is designed by way of example as a detent element that engages with a recess, not illustrated, in housing 26 of hand-held power tool 12. For detaching this force-fit and form-fit connection, rechargeable battery pack 18 includes a control element 76 that is mechanically coupled to locking element 74 and via which locking element 74 in the connected state may be moved out of the recess. Control element 76 is designed as a pushbutton element by way of example and is operable in parallel to connection direction 23.

Figure 3:
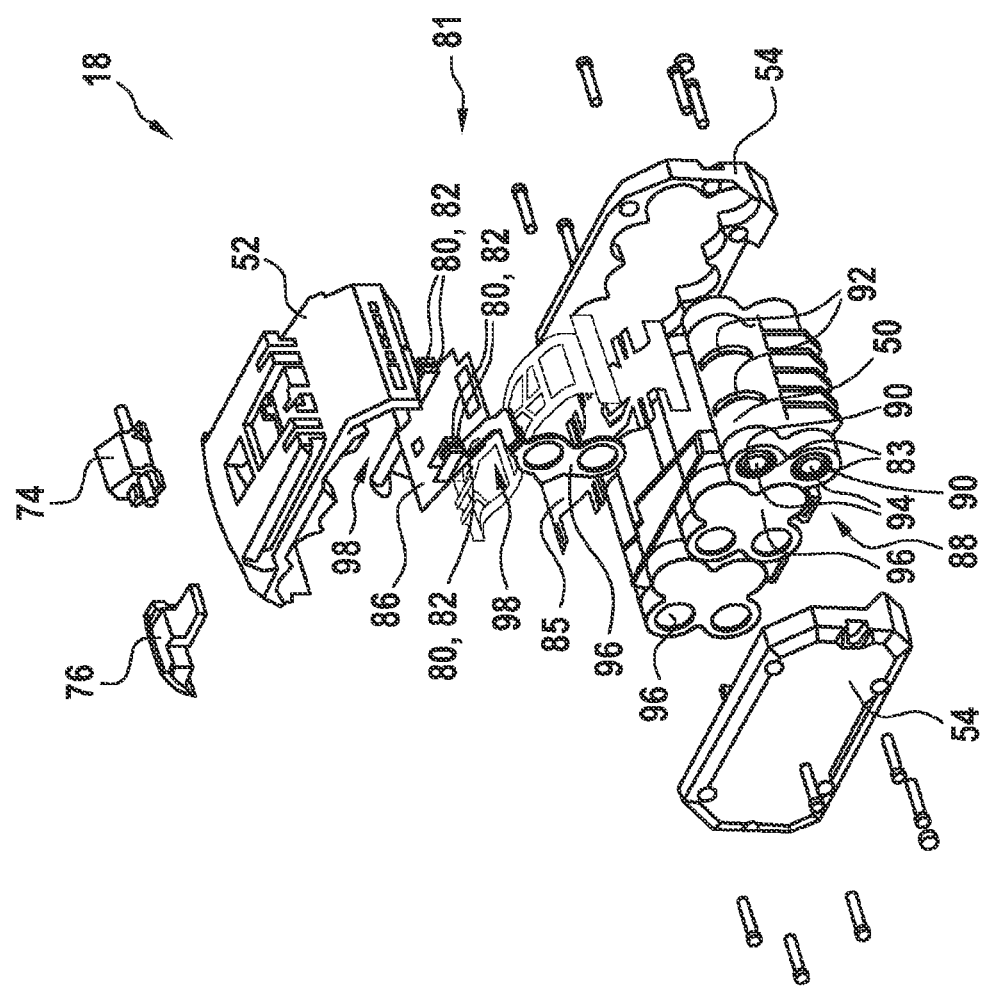
FIG. 3 shows an exploded view of the rechargeable battery pack.

In addition, electrical interface 46 includes five electrical contact elements 80 (see FIG. 3). Electrical contact elements 80 are situated between retaining elements 60. Electrical contact elements 80 are designed, at least in part, for connection to electrical contact elements, not illustrated, of electrical interface 44 of hand-held power tool 12. Two of electrical contact elements 80 are designed as power contacts 82 via which an electrical current for supplying hand-held power tool 12 with power flows during operation. Three of electrical contact elements 80 are designed as additional contacts.

Furthermore, system 10 includes a mechanical coding 11 via which it may be ensured that only the combination of rechargeable battery pack 18 and consumer 14 provided by the manufacturer are mechanically connectable to one another. Mechanical coding 11 includes a coding element 78 on the rechargeable battery pack side and at least one coding element (not illustrated) on the consumer side. Coding element 78 of rechargeable battery pack 18 is situated on the outer surface of housing 48. In particular, coding element 78 is situated in the area of mechanical interface 22 and between retaining elements 60. Coding element 78 is designed as a molding in one piece with interface housing part 52. Coding element 78 is designed as an elongated web that extends transversely with respect to the two retaining elements 60.

FIG. 3 shows rechargeable battery pack 18 in an exploded view. An electronics system 81 and ten rechargeable battery cells 83 by way of example are situated in housing 48 of rechargeable battery pack 18. Rechargeable battery pack 18 is designed as an 18 V rechargeable battery pack. Electronics system 81 includes two circuit boards 85, 86 that are connected to one another via a plug-in connection 88. First circuit board 85 is designed as a flexible circuit board. Rechargeable battery cells 83 are accommodated in cell housing 50. Rechargeable battery pack 18 is designed as a two-layer rechargeable battery pack 18 by way of example. A two-layer rechargeable battery pack 18 is understood in particular to mean that rechargeable battery cells 83 are situated in two layers, rechargeable battery cells 83 within one layer being adjacently situated on a plane, and within one layer the number of rechargeable battery cells 83 not being less than the number of layers. One layer includes five rechargeable battery cells 83 by way of example. It is likewise possible for rechargeable battery pack 18 to be designed as a three-layer or four-layer rechargeable battery pack, as the result of which the weight of rechargeable battery pack 18 and accordingly the load on mechanical interface 22 of rechargeable battery pack 18 increase.

Figure 4:
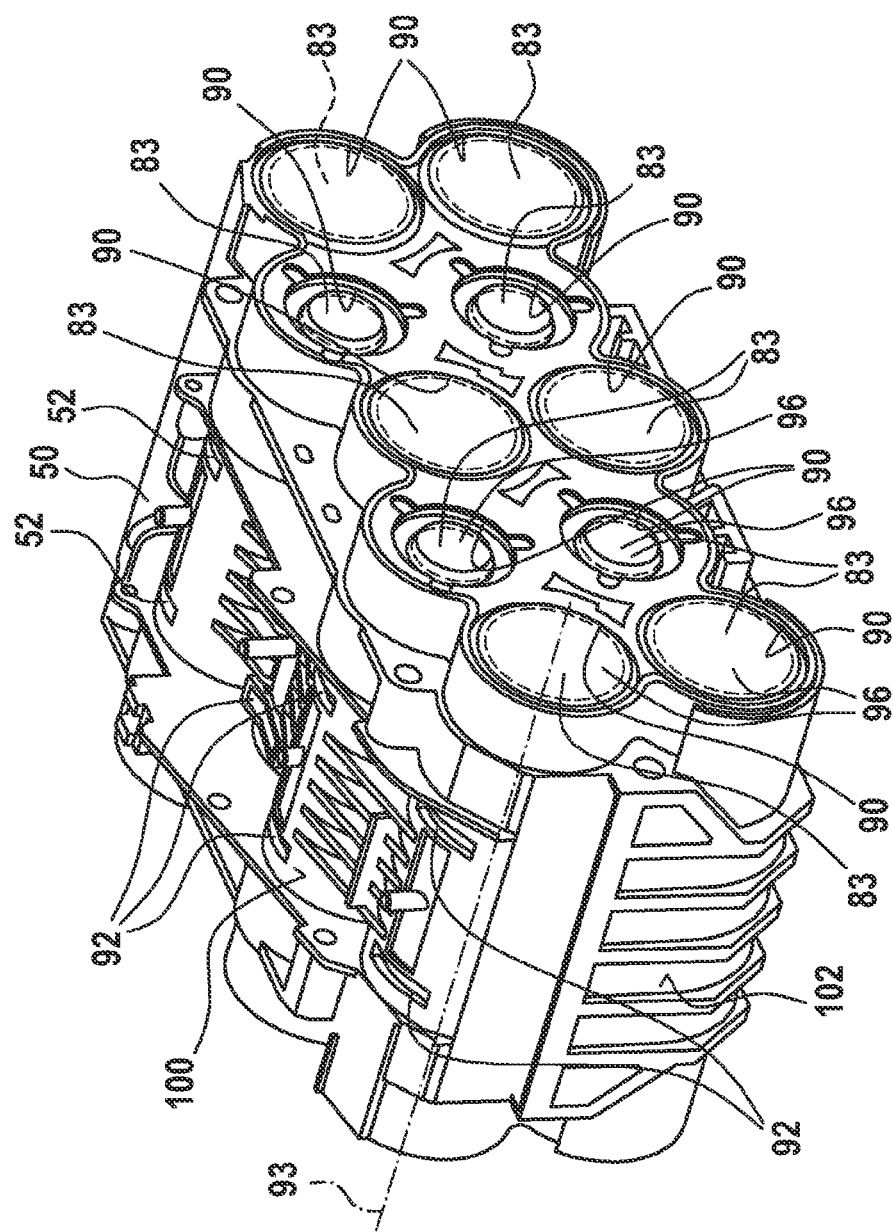
FIG. 4 shows a perspective view of a cell housing together with accommodated rechargeable battery cells.

Cell housing 50 includes receiving areas 88 in which a single rechargeable battery cell 83 is situated in each case. Receiving areas 88 are each delimited by a wall 89 that is adapted to the shape of rechargeable battery cells 83. Walls 89 have a hollow cylindrical shape, at least in part. Cell housing 50 includes axial openings 90 and radial openings 92. FIG. 4 shows an enlarged perspective view of cell housing 50 together with rechargeable battery cells 83 situated in receiving areas 88.

Axial openings 90 extend essentially perpendicularly with respect to a longitudinal axis 93 of rechargeable battery cells 83 situated in particular receiving areas 88. Axial openings 90 are designed for contacting on the edge side and/or for accommodating rechargeable battery cells 83 in receiving areas 88. Axial openings 90 have an essentially circular design. Cell housing 50 preferably includes two axial openings 90, situated on opposite sides of cell housing 50, for each receiving area 88. Rechargeable battery cell 83 may advantageously be accommodated in or inserted into receiving area 88 via at least one of axial openings 90. In particular, oppositely situated axial openings 90 have different designs, such that rechargeable battery cells 83 may be inserted into receiving area 88 only via one of the two oppositely situated axial openings 90. The width of cell housing 50 essentially corresponds to the length of rechargeable battery cells 83. Rechargeable battery cells 83 are designed as round cells, and include a cell pole 94 at each of their ends. In the state situated in receiving area 88, a cell pole 94 is situated in each case in the area of an axial opening 90 and is thus electrically contactable. Rechargeable battery cells 83 are electrically connected to one another via cell connectors 96. Cell connectors 96 are situated between rechargeable battery cells 83 and side housing parts 54. In particular, axial openings 90 are at least partially, preferably completely, covered or closed by cell connectors 96. Cell connectors 96 are made up of small metallic plates that are integrally joined to rechargeable battery cells 83, in particular to cell poles 94 of rechargeable battery cells 83. The connection may take place via a resistance welding method or a laser welding method, for example. Rechargeable battery pack 18 includes multiple cell connectors 96 that are integrally joined to two or four rechargeable battery cells 83 by way of example. Rechargeable battery cells 83 accommodated in cell housing 50 are connected to electronics system 81, in particular to second circuit board 86. In particular, rechargeable battery cells 83 accommodated in cell housing 50 are connected to the two power contacts 82, which are fastened to second circuit board 86, via cell connectors 96 and two electrical contact devices 98.

Radial openings 92 are provided for laterally contacting rechargeable battery cells 83. Single cell monitoring, in particular single cell voltage monitoring, may be advantageously achieved via the lateral contacting of rechargeable battery cells 83. In this regard, lateral contacting is understood in particular to mean contacting away from cell poles 94 of rechargeable battery cells 83. Cell housing 50 includes an outer wall surface 100 and an inner wall surface 102. In the installed state of rechargeable battery pack 18, outer wall surface 100 partially forms the outer surface of rechargeable battery pack 18, and in the installed state of rechargeable battery pack 18, inner wall surface 102 is completely enclosed by the outer surface of rechargeable battery pack 18. Radial openings 92 are situated in or on inner wall surface 102. Radial openings 92 have a rectangular design by way of example, and extend around rechargeable battery cells 83 in the circumferential direction. Four of the ten receiving areas 88 of cell housing 50 include radial openings 92. In particular, receiving areas 88, which include radial openings 92, include two radial openings 92 in each case.

Figure 5:
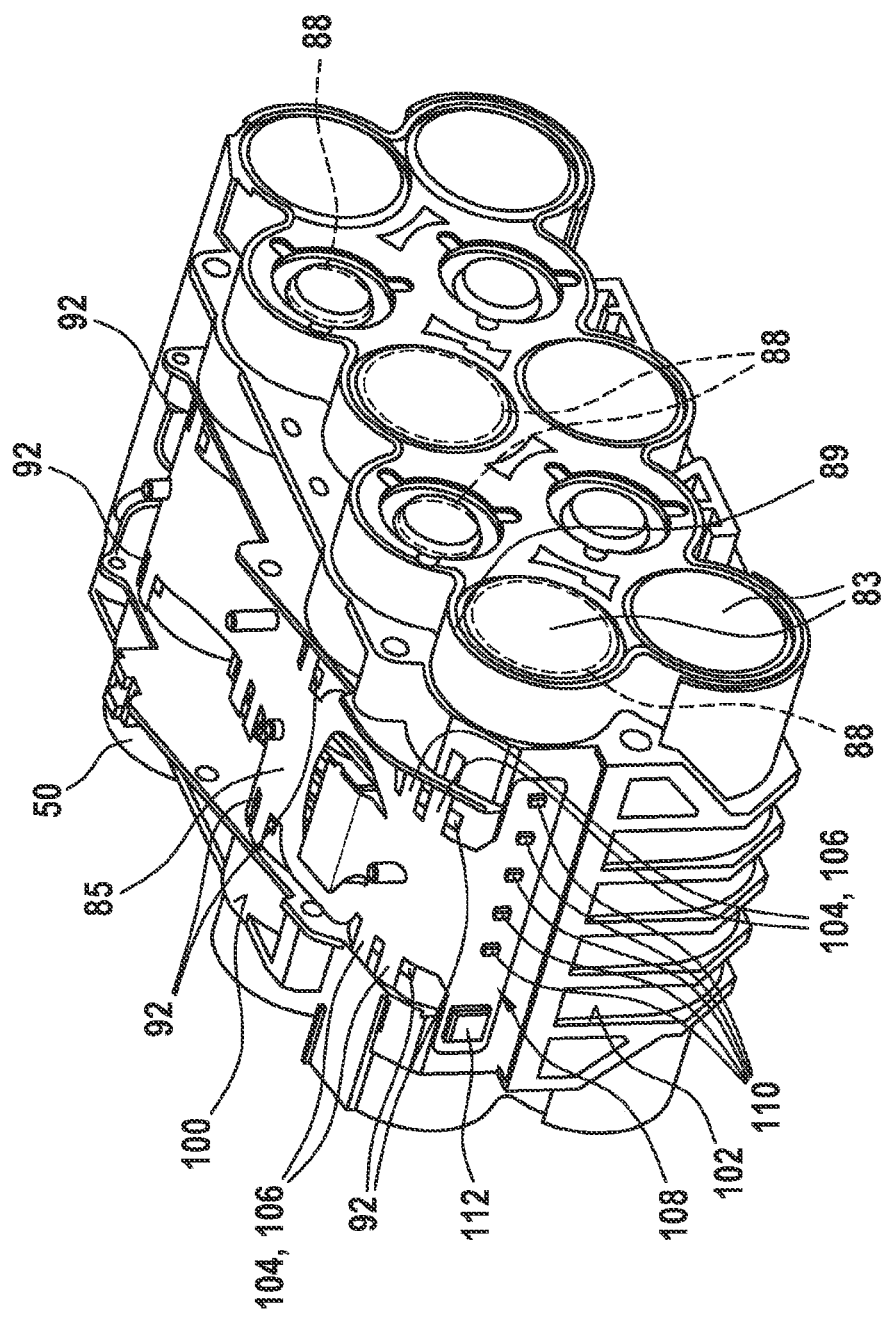
FIG. 5 shows a perspective view of the cell housing according to FIG. 4 together with a connected second circuit board.

FIG. 5 also shows installed first circuit board 85. First circuit board 85 is made of a laminated copper strip by way of example, electrical contact elements 104 and the electrical lines being formed by the copper strip. First circuit board 85 rests against cell housing 50, in particular against inner wall surface 102 of cell housing 50. In particular, first circuit board 85 rests against the side of cell housing 50 on which radial openings 92 are situated. First circuit board 85 has a flexible design such that over its length it follows the outer contour of cell housing 50. Electrical contact elements 104 of first circuit board 85 are designed as bendable contact tongues 106. Bendable contact tongues 106 are designed to immerge into one of receiving areas 88 via radial openings 92 in order to electrically contact rechargeable battery cell 83 situated in receiving area 88. In the connected state, electrical contact element 104 rests against rechargeable battery cell 83, in particular rests laterally against rechargeable battery cell 83, as the result of which a voltage of individual rechargeable battery cell 83 is ascertainable. Electrical contact element 104 is preferably fixed between rechargeable battery cell 83 and wall 89 of receiving area 88, for example by clamping.

In particular, rechargeable battery cells 83 of the upper layer facing electronics system 81 are electrically contactable via radial openings 92. As an example, four of the five rechargeable battery cells 83 of the upper layer are situated in receiving areas 88 with radial openings 92. Alternatively, it is also possible for each of rechargeable battery cells 83 of the upper layer and/or also rechargeable battery cells 83 of the lower layer to be electrically contactable for single cell monitoring. Receiving areas 88 with radial openings 92 each include two radial openings 92 via which two electrical contact elements 104 are in each case connected to rechargeable battery cells 83. Rechargeable battery cells 83 are thus laterally connected to first circuit board 85 via four electrical contact elements 104 in each case, as the result of which with the aid of redundancy it may be ensured that voltage monitoring of rechargeable battery cell 83 may still take place in the event of failure of an electrical contact element 104.

In addition, a display unit 108 that is designed as a state of charge display by way of example is situated on first circuit board 85. Display unit 108 includes five display elements 110 that are designed as light-emitting elements and situated on a side of first circuit board 85 facing away from cell housing 50. Situated next to display elements 110 is an actuating element 112 via which first circuit board 85 is controllable. For example, display unit 108 may be activated and/or deactivated via actuating element 112.

Figure 6:
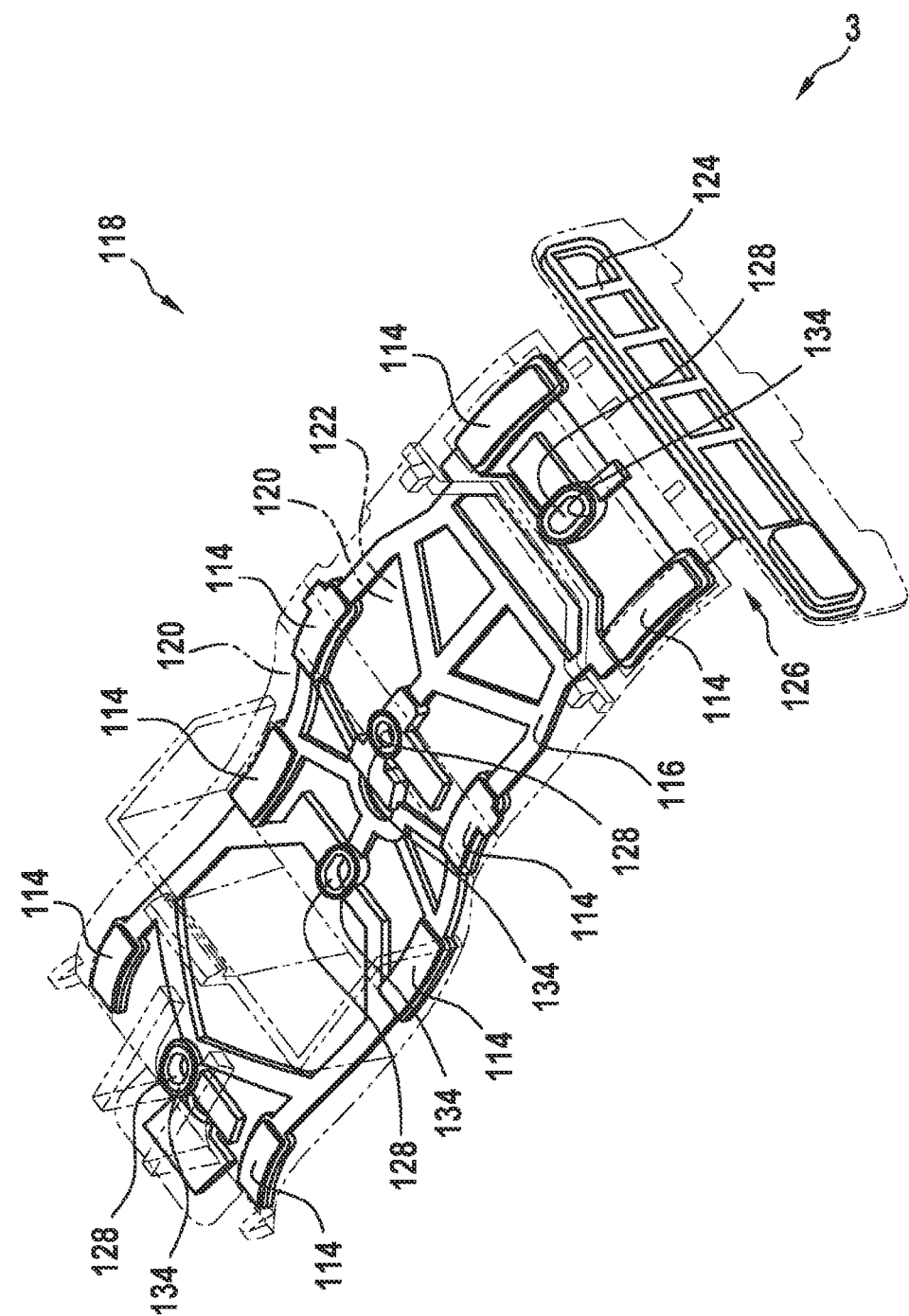
FIG. 6 shows a perspective view of a sealing element carrier.

Radial openings 92 are only partially covered by first circuit board 85 or electrical contact elements 104 of first circuit board 85, so that these radial openings in part form a free access to rechargeable battery cell 83. Rechargeable battery pack 18 includes sealing elements 114 for protecting the lateral surface of rechargeable battery cells 83 that is free via radial opening 92. Sealing elements 114 are designed as a soft plastic component 116 of a sealing element carrier 118 which also includes a hard plastic component 120. Hard plastic component 120 of sealing element carrier 118 is depicted in dashed lines in FIG. 6. Sealing element carrier 118 is shown in a perspective view in FIG. 6. Sealing element carrier 118 is manufactured via a two-component injection molding process. Sealing element carrier 118 includes a sealing element 114 for each radial opening 92 for sealing off radial opening 92 in the connected state. In particular, the surface area of sealing elements 114 is greater than the surface area of radial opening 92. In particular, sealing element carrier 118 includes a first hard plastic component 122 and a second hard plastic component 124 that are movably connected to one another via soft plastic component 116. Soft plastic component 116 advantageously forms an articulated joint 126 in the area between first and second hard plastic components 122, 124. The first component and second hard plastic component 124 are made of the same material. In particular, hard plastic component 120 is made of a transparent plastic. The soft plastic component is made of a rubber.

Figure 7:
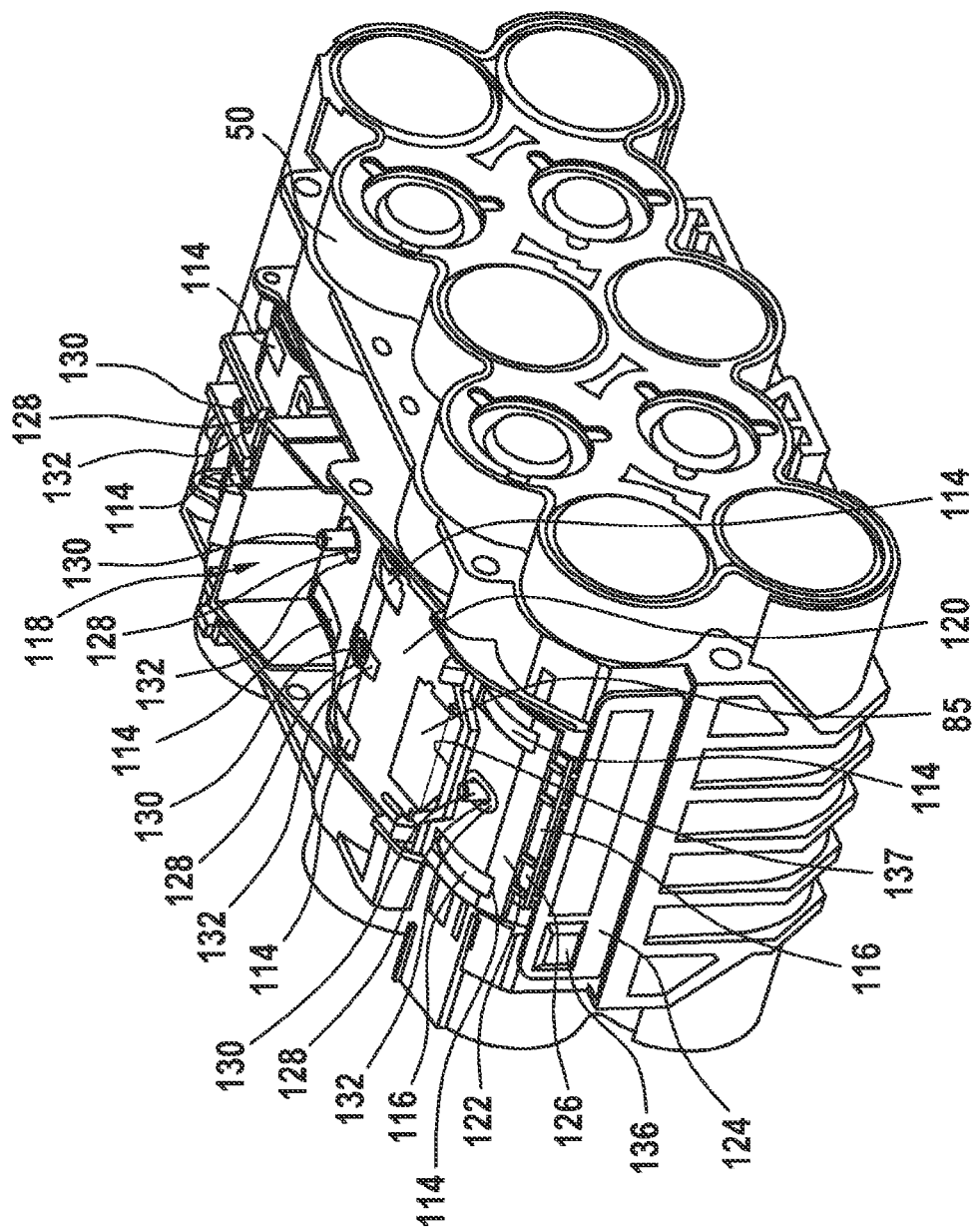
FIG. 7 shows a perspective view of the cell housing according to FIG. 5 together with the sealing element carrier according to FIG. 6.

FIG. 7 shows a perspective view of sealing element carrier 118 in the installed state on flexible first circuit board 85. Flexible circuit board 85 is covered, in particular essentially completely covered, by sealing element carrier 118. To facilitate installation of sealing element carrier 118, sealing element carrier 118 includes positioning means 128 in hard plastic component 120, which are designed as circular recesses, for example. Cell housing 50 includes corresponding positioning means 130 that are designed as cylindrical pins by way of example. To ensure that dust cannot reach rechargeable battery cells 83 via positioning means 128 designed as recesses, further sealing elements 132 formed by soft plastic component 116 are situated in the recesses. In the connected state, positioning means 128 of sealing element carrier 118 and positioning means 130 of cell housing 50 are engaged with one another in such a way that sealing elements 114 are situated above radial openings 92 and seal them off.

In the installed state, first hard plastic component 122 and second hard plastic component 124 are situated on different sides of cell housing 50, in particular on different sides of inner wall surface 102 of cell housing 50. First hard plastic component 122 is situated on the side of cell housing 50 facing electronics system 81. Sealing elements 114 and positioning means 128 are arranged in or injected into first hard plastic component 122. Second hard plastic component 124 covers display elements 110 of display unit 108, thus protecting them. Since hard plastic component 120 has a transparent design, the light emitted from display elements 110 may continue to pass to the outside. Also situated in second hard plastic component 124 is an additional elastic sealing element 136 that is made of soft plastic component 116, and that is situated above actuating element 112 of display unit 108 and seals it off. Articulated joint 126, made of soft plastic component 116, between the two hard plastic components 122, 124 is situated in the transition area between the two different sides of cell housing 50, and allows simple and dust-tight installation.

Figure 8:
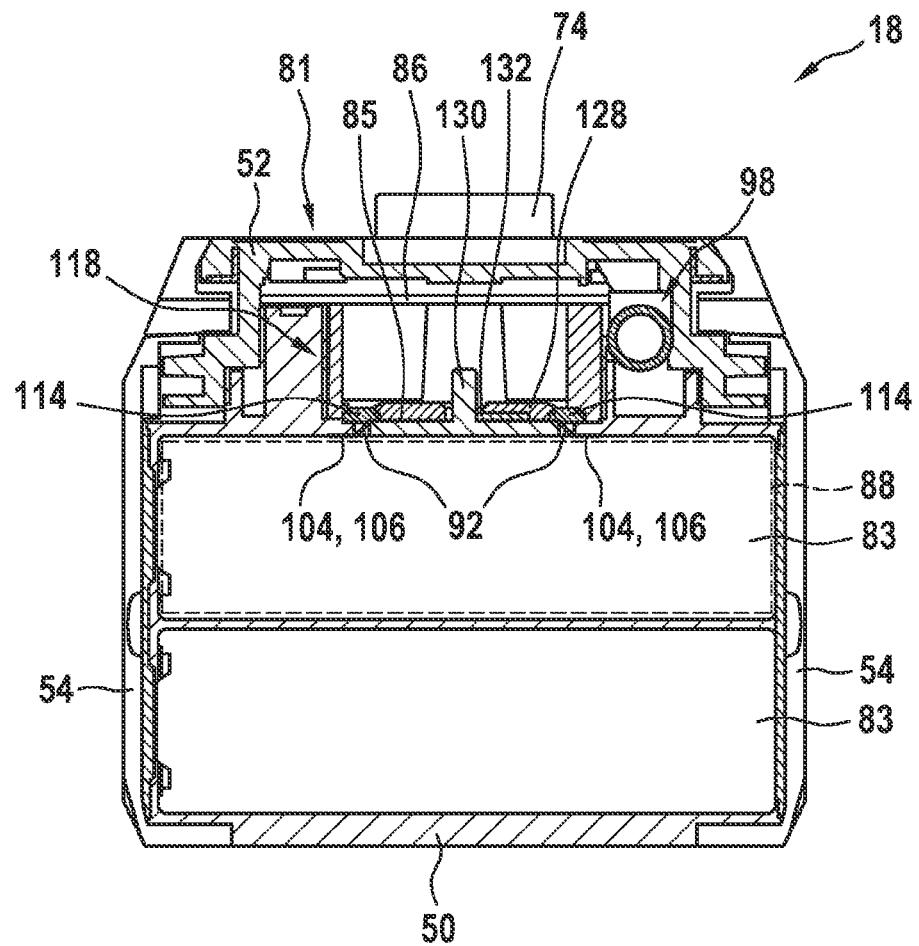
FIG. 8 shows a cross section of the rechargeable battery pack.

FIG. 8 shows a cross section A of installed rechargeable battery pack 18. The cross section extends in particular through two radial openings 92, and positioning means 128, 130 situated between the radial openings. In the cross section it is shown that sealing element carrier 118 is situated between first circuit board 85 and second circuit board 86 of electronics system 81. In particular, first and second circuit boards 85, 86 rest against sealing element carrier 118.

Electrical contact elements 104 of first circuit board 85 immerge into receiving area 88 of rechargeable battery cell 83 via radial openings 92 and electrically contact the rechargeable battery cell. Radial openings 92 are completely closed by sealing elements 114 of sealing element carrier 118, so that no foreign particles such as dust may penetrate into receiving area 88. Rechargeable battery cell 83 is advantageously enclosed by cell housing 50 as well as by interface housing part 52 on the side with radial openings 92.

Figure 9:
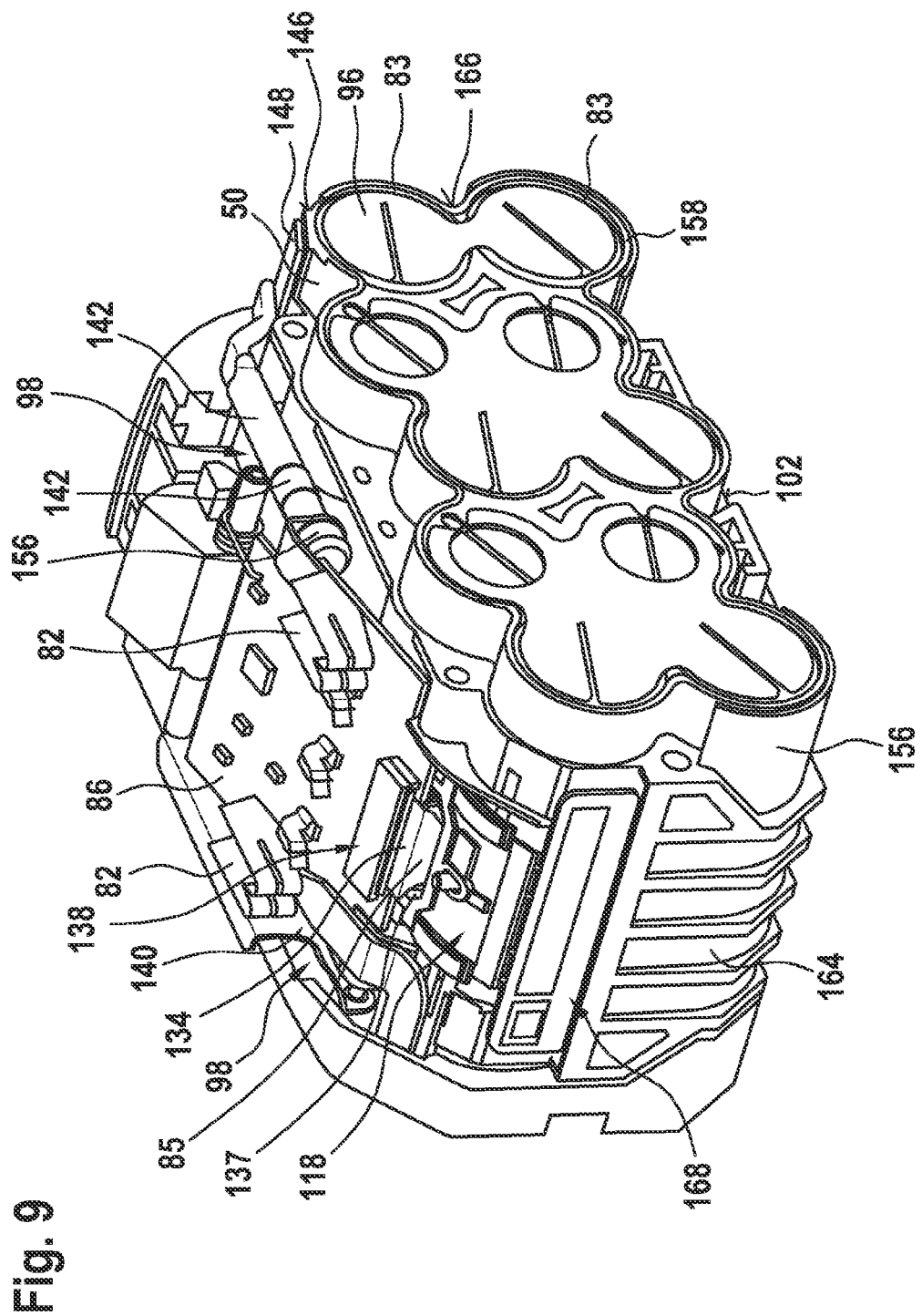
FIG. 9 shows a perspective view of the rechargeable battery pack together with a partially disassembled housing.

FIG. 9 shows a perspective view of installed rechargeable battery pack 18 without interface housing part 52 and without a side wall 54. While rechargeable battery cells 83 are individually contacted via radial openings 92 and connected to first circuit board 85, rechargeable battery cells 83 are connected to one another via axial openings 90, and are connected to power contacts 82 on second circuit board 86 via electrical contact devices 98. A contact area 134 of first circuit board 85 passes through sealing element carrier 118 via a recess 137 in sealing element carrier 118, and is connected to second circuit board 86 via a plug-in connection 138. Second circuit board 86 includes a processing unit, a memory unit, and a control unit for controlling or regulating rechargeable battery pack 18.

Rechargeable battery pack 18 includes two electrical contact devices 98. One of electrical contact devices 98 connects rechargeable battery cells 83 to one of power contacts 82 via a flat connector 140 made of copper. Other electrical contact device 98 connects rechargeable battery cells 83 to other power contact 82 via a tubular conductor 142 and via a fuse element 144. Fuse element 144 is designed as a safety fuse. Fuse element 144 has a cylindrical design. Fuse element 144 includes a ceramic sleeve 145 in which a metallic wire 147 is accommodated (see FIG. 10). Metallic wire 147 is designed as a silver wire by way of example. Metallic wire 147 extends coaxially with respect to the longitudinal axis of ceramic sleeve 145, and exits it at both ends of ceramic sleeve 145. In addition, fuse element 144 includes two metallic end caps 149 via which fuse element 144 is electrically and mechanically connectable. End caps 149 are shaped in such a way that in a first area 151 they enclose ceramic sleeve 145 in each case, and in a second area 153, in each case they surround metallic wire 147 that is not enclosed by ceramic sleeve 145. In particular, in first area 151 the end caps rest against ceramic sleeve 145, and in the second area they rest against metallic wire 147.

In particular, rechargeable battery cells 83 are integrally joined to a metallic cell connector 96 in an area in which two edge-side rechargeable battery cells 83 of the upper layer and the lower layer are connected via cell connector 96. The integral joining of rechargeable battery cells 83 to cell connector 96 takes place on the side of axial openings 90 of cell housing 50. Cell connector 96 on its top side has an angled design in the direction of electrical contact device 98, and in this area includes a connecting surface 146 that extends essentially perpendicularly with respect to axial openings 90. Cell connector 96 is integrally joined to a metallic conductor 148 via connecting surface 146, for example via a weld joint. Metallic conductor 148 has a plate-shaped design, and extends in parallel to the longitudinal axis of rechargeable battery cells 83.

Tubular conductor 142 is connected to metallic conductor 148 with the aid of a weld joint. Tubular conductor 142 and metallic conductor 148 are made of copper. The connection between tubular conductor 142 and metallic conductor 148 takes place at a first end 150 of tubular conductor 142. In the area of first end 150 of tubular conductor 142, tubular conductor 142 is bent downwardly, i.e., in the direction of metallic conductor 148. In addition, tubular conductor 142 has a flattened design at first end 150 to allow integral joining to metallic conductor 148 with the aid of a welding method.

At second end 152 of tubular conductor 142, tubular conductor 142 is mechanically and electrically connected to fuse element 144, in particular to one of end caps 149 of fuse element 144 or to second area 153 of end cap 149. Tubular conductor 142 has a cross-sectional change 154 at second end 152 of tubular conductor 142. Cross-sectional change 154 is designed in such a way that fuse element 144 or one of end caps 145 of fuse element 144 may be accommodated within tubular conductor 142, and thus mechanically and electrically connected to it. In particular, tubular conductor 142 is connected to fuse element 144 via a press fit connection in the area of cross-sectional change 154. As an example, tubular conductor 142 has a crimped design in the area of cross-sectional change 154, so that the inner diameter is reduced in the area of second end 152 of tubular conductor 154.

Other end cap 149 of fuse element 144 is connected to power contact 82 via an electrical conductor 155 that is designed as a flat connector 156 by way of example. Flat connector 156 with one end rests against end cap 149 of fuse element 144, and with the other end rests against power contact 82. The connection of flat connector 156 to fuse element 144 takes place via a hollow cylindrical molding at the flat connector, which is connected in a force-fit manner to end cap 149, in particular to first area 151 of end cap 149.

Figure 10:
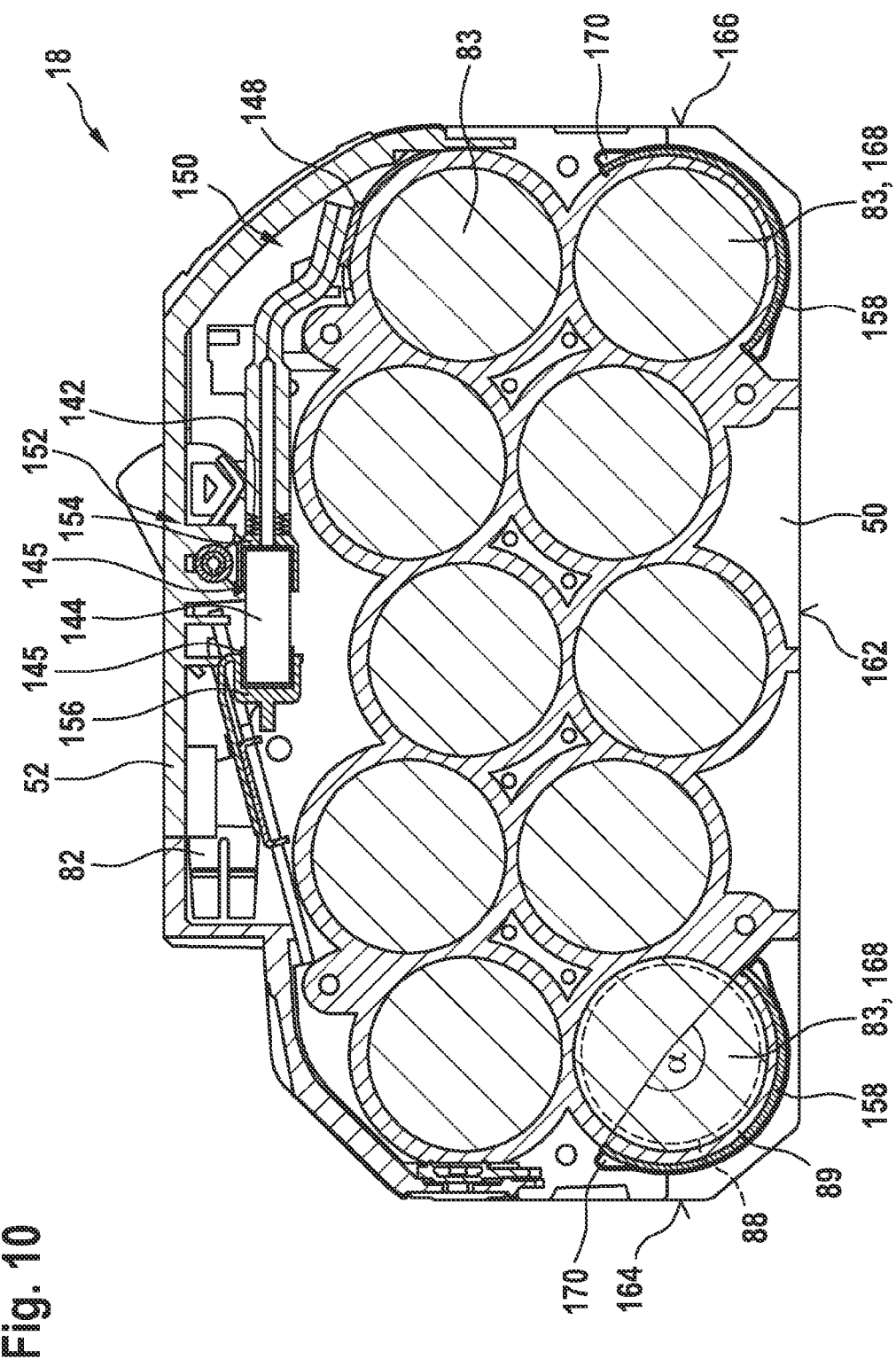
FIG. 10 shows a longitudinal section of the rechargeable battery pack.
Figure 11:
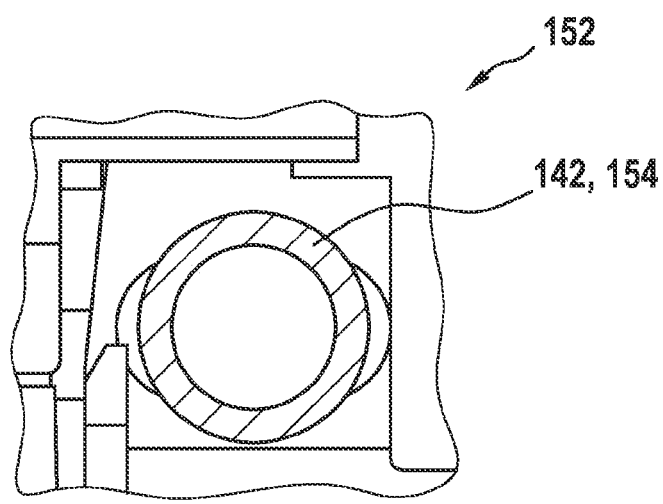
FIG. 11 shows a first cross section of an electrical contact device of the rechargeable battery pack.
Figure 12:
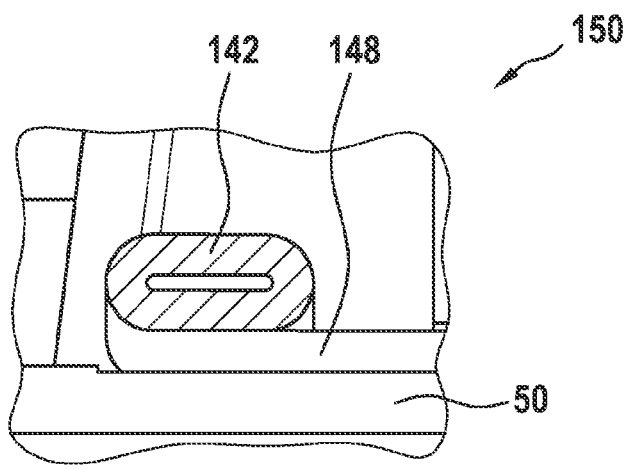
FIG. 12 shows a second cross section of the electrical contact device of the rechargeable battery pack.

FIG. 10 shows a longitudinal section of electrical contact device 98. Tubular conductor 142 is formed from a hollow tube with the aid of a forming method. The line cross section is essentially constant over the length of tubular conductor 142. Adapting the shape of tubular conductor 142 changes the inner diameter of tubular conductor 142 between first end 150 and second end 152. In this regard, an "inner diameter" is understood in particular to mean a diameter of a cavity within tubular conductor 142. In particular, tubular conductor 142 in the area of second end 152 has a larger inner diameter than in the area of first end 150, tubular conductor 142 having the largest inner diameter between the two ends 150, 152. Cross-sectional change 154 is situated in the area of second end 152, and has a circular ring-shaped cross section that essentially corresponds to an outer contour of adjoining end cap 149 of fuse element 144. FIG. 11 shows a cross section of the hollow cylindrical area between the two ends 150, 152, in which the inner diameter is greatest. To achieve a large line cross section, tubular conductor 142 in this area has a wall thickness that essentially corresponds to the inner diameter. In the area of first end 150, tubular conductor 142 has a flattened design such that the inner diameter is minimal or zero, since two oppositely situated sides of tubular conductor 142 rest against one another.

Figure 13:
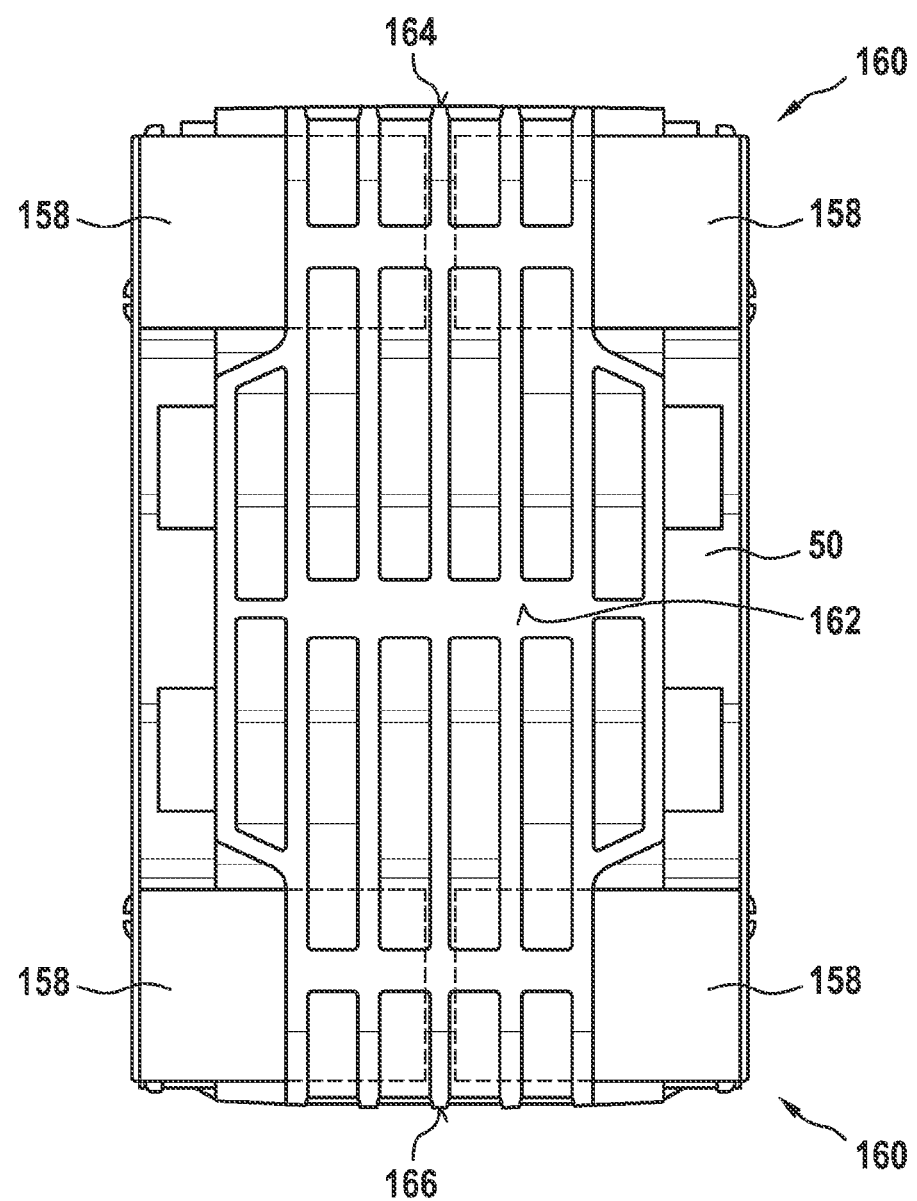
FIG. 13 shows a bottom view of the cell housing together with inserted protective elements.
Figure 14:
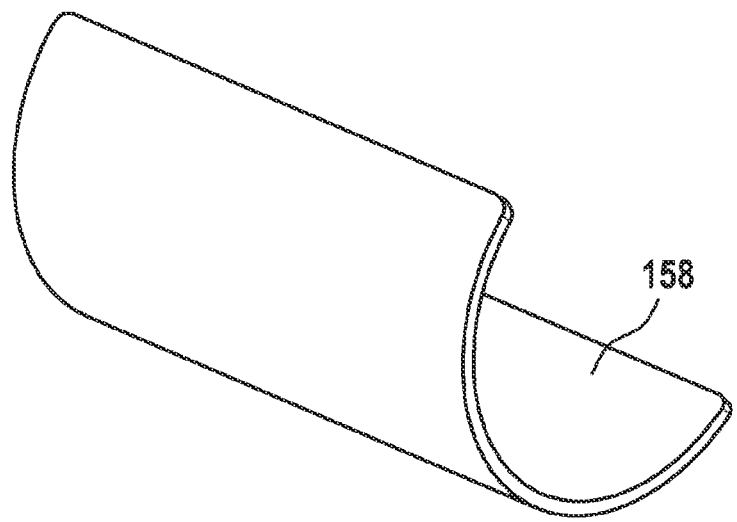
FIG. 14 shows a perspective view of a protective element.

Rechargeable battery pack 18 includes protective elements 158 in order to protect rechargeable battery cells 83 in the event of a fall of rechargeable battery pack 18. Protective elements 158 are shown in FIG. 9 in a perspective view, and in FIG. 10 in a longitudinal section of rechargeable battery pack 18. FIG. 13 shows a bottom view of rechargeable battery pack 18 without side walls 54. Rechargeable battery pack 18 includes four protective elements 158, in each case two protective elements 158 being situated adjacent to a rechargeable battery cell 83 and thus protecting it. Protective elements 158 are made of a metal sheet, for example a steel sheet. FIG. 14 shows a protective element 158 in a perspective view. Protective elements 158 are preferably situated adjacent to rechargeable battery cells 83 in the area of edges 160 of housing 48 of rechargeable battery pack 18, since in the event of a fall of rechargeable battery pack 18 on one of edges 160, the entire force of the impact acts on a small surface area, and therefore the risk of damage or deformation of housing 48 or of rechargeable battery pack 18 is particularly great. Edges 160 are in particular edges 160 that are situated in a transition area from the bottom side or a standing surface 162 of rechargeable battery pack 18 to a front surface 164 or rear surface 166. Standing surface 162 is situated in particular on the side opposite from the side of rechargeable battery pack 18 that includes mechanical interface 22 of the rechargeable battery pack. Front surface 164 includes display unit 108, and extends essentially perpendicularly with respect to standing surface 162. Rear surface 166 is situated opposite from front surface 164. In particular, edge-side rechargeable battery cells 168 of rechargeable battery pack 18, preferably edge-side rechargeable battery cells 168 of the lowermost layer of rechargeable battery cells 83 of rechargeable battery pack 18, are partially enclosed by protective elements 158. In this regard, edge-side rechargeable battery cells 168 are understood in particular to mean a first and a last rechargeable battery cell of a layer of rechargeable battery cells 83.

Rechargeable battery cells 83 accommodated in receiving areas 88 are circumferentially enclosed by wall 89 of cell housing 50. Cell housing 50 made of a plastic, for example HDPE, thus already partially protects rechargeable battery cells 83 from an action of force in the event of a fall. This protection is increased by edge-side rechargeable battery cells 168 being additionally partially circumferentially enclosed by protective elements 158. In particular, edge-side rechargeable battery cells 168 are circumferentially enclosed by protective element 158 in an angular range α of approximately 170°. For each protective element 158, cell housing 50 includes a receiving pocket 170 that is designed for force-fit and form-fit connection to protective element 158. In receiving pocket 170 of cell housing 50, protective element 158 at two opposite side surfaces is enclosed and held in a force-fit manner by cell housing 50. During connection of protective elements 158 to cell housing 50, protective elements 158 are inserted into receiving pockets 170 until protective elements 158 rest against a stop. In this way, metallic protective element 158 is preferably electrically insulated from rechargeable battery cells 83 or electronics system 81 of rechargeable battery pack 18. The shape of wall 89 of cell housing 50, which delimits receiving area 88, and also of protective element 158 which rests against the wall, are adapted to the cylindrical contour of rechargeable battery cells 83, in particular with a curved design.

Cell housing 50 includes two pairs of receiving pockets 170 in each case which are adjacently situated in such a way that protective elements 158 are accommodated in the receiving pockets via opposite movements from the side (see FIG. 13). A length of protective elements 158 corresponds to approximately 45% of the length of rechargeable battery cells 83 or to approximately 45% of the width of cell housing 50. Two protective elements 158 are in each case situated one behind the other in receiving pockets 170 in such a way that approximately 90% of the length of edge-side rechargeable battery cells 168 is enclosed by protective elements 158. Alternatively, it would also be possible to protect edge-side rechargeable battery cells 168 by a single continuous protective element in each case.

Figure 15:
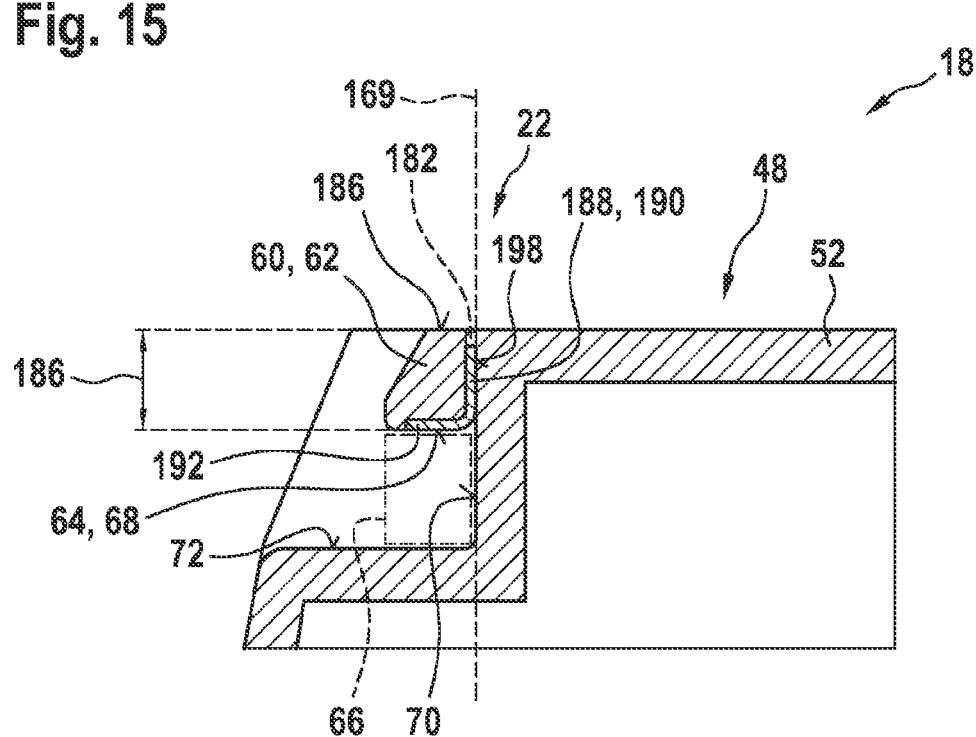
FIG. 15 shows a cross section of a guide rail of the rechargeable battery pack.

FIG. 15 shows a cross section of retaining element 60 designed as a guide rail 62. Guide groove 66 is situated adjacent to or below retaining element 60. Guide rail 62 or retaining element 60 is made of a plastic. Guide rail 62 or retaining element 60 in particular has a one-piece design with interface housing part 52. Mechanical interface 22 includes a predetermined breaking point 182 to ensure that a defined break, and thus not a random break, takes place in the event of an overload of mechanical interface 22 or of retaining element 60. Predetermined breaking point 182 is situated in the area of retaining element 60. In particular, predetermined breaking point 182 is situated between sliding surface 64 of mechanical interface 22 and a top side 184 of retaining element 60 opposite from sliding surface 64. Predetermined breaking point 182 is in particular designed as a targeted material weakening of the plastic. A material thickness 186 of retaining element 60 changes abruptly and/or significantly in the area of predetermined breaking point 182. Material thickness 186 is designed, for example, as a thickness of retaining element 60 or as a maximum distance of sliding surface 64 from top side 184 of retaining element 60. An "abrupt" change is understood in particular to mean a discrete change in material thickness 186. A "significant" change is understood in particular to mean that material thickness 186 decreases to at least 50% of the original material thickness, in particular to at least 30% of the original material thickness, preferably to at least 15% of the original material thickness. As an example, material thickness 186 of predetermined breaking point 182 in the shown cross section decreases to approximately 15% of original material thickness 186 relative to the two adjacent areas.

Predetermined breaking point 182 is implemented with the aid of a predetermined breaking point element 188 that is made of a steel sheet, for example. Predetermined breaking point element 188 is connected to retaining element 60. In particular, predetermined breaking point element 188 is at least partially enclosed by the retaining element. In the specific embodiment shown, predetermined breaking point element 188 is designed as a leg 190 of an angular element 192, in particular a metal bracket. Angular element 192 includes two legs 190, 194 that by way of example extend at a right angle with respect to one another. The two legs 190, 194 by way of example have different lengths in the cross section. Alternatively, however, other angles between legs 190, 194 would also be possible. Angular element 192 has a one-piece design. Leg 190 of angular element 192 designed as a predetermined breaking point element 188 extends essentially perpendicularly with respect to sliding surface 64 of retaining element 60. In particular, a difference between material thickness 186 and a height of predetermined breaking point element 188 essentially corresponds to a height of predetermined breaking point 182.

In the state connected to hand-held power tool 12, the weight force of rechargeable battery pack 18 acts on sliding surfaces 64 of mechanical interface 22 primarily via the guide rails of hand-held power tool 12 that are situated in guide grooves 66. To implement a preferably efficient predetermined breaking point 182, predetermined breaking point 182 is situated on, adjoining, or directly adjacent to a plane 196 that extends essentially congruently with side wall 70 of guide groove 66. In the specific embodiment shown, predetermined breaking point element 188 is situated in such a way that it extends essentially in parallel to plane 196. In particular, predetermined breaking point element 188 is situated in such a way that it abuts plane 196, in that an outer surface 198 of predetermined breaking point element 188 extends on plane 196.

In addition, rechargeable battery pack 18, in particular mechanical interface 22, includes a wear protection element 200. Wear protection element 200 is designed, for example, as second leg 194 of angular element 192, and thus in one piece with predetermined breaking point element 188. Wear protection element 200 extends in parallel to sliding surface 64. In particular, wear protection element 200 at least partially forms sliding surface 64 of retaining element 60. Wear protection element 200 is partially enclosed by retaining element 60 or guide rail 62. The wear that occurs between guide rails 62 of rechargeable battery pack 18 and the guide rails of hand-held power tool 12 during operation of hand-held power tool 12 may advantageously be greatly reduced by wear protection element 200. Wear protection element 200 is made of metal by way of example.

Figure 16:
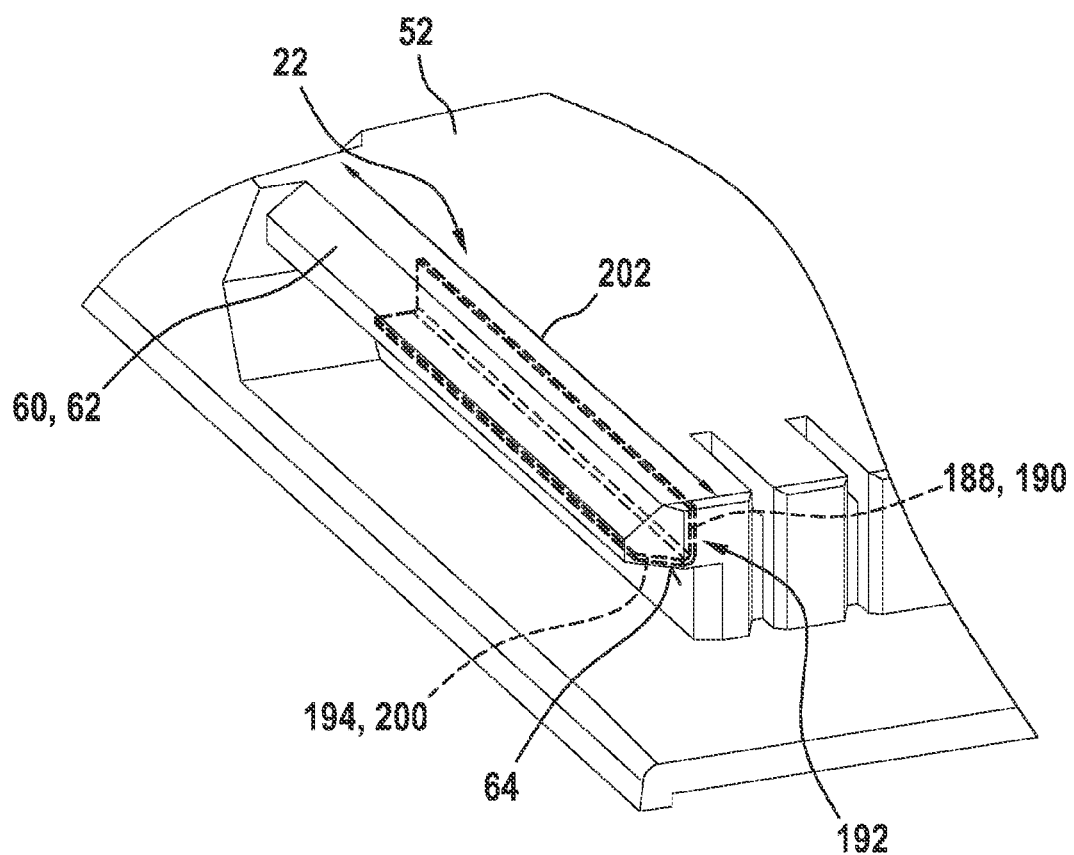
FIG. 16 shows a perspective view of an interface housing of the rechargeable battery pack.

FIG. 16 shows a perspective view of interface housing part 52. Angular element 192, which is extrusion-coated in retaining element 60 or in guide rail 62, and which includes predetermined breaking point element 188 and wear protection element 200, is shown in dashed lines. To allow a preferably defined break with the aid of predetermined breaking point 182, a length of angular element 192 or of predetermined breaking point element 188 corresponds to approximately 80% of a length 202 of retaining element 60 or of sliding surface 64 of retaining element 60.

Figure 17:
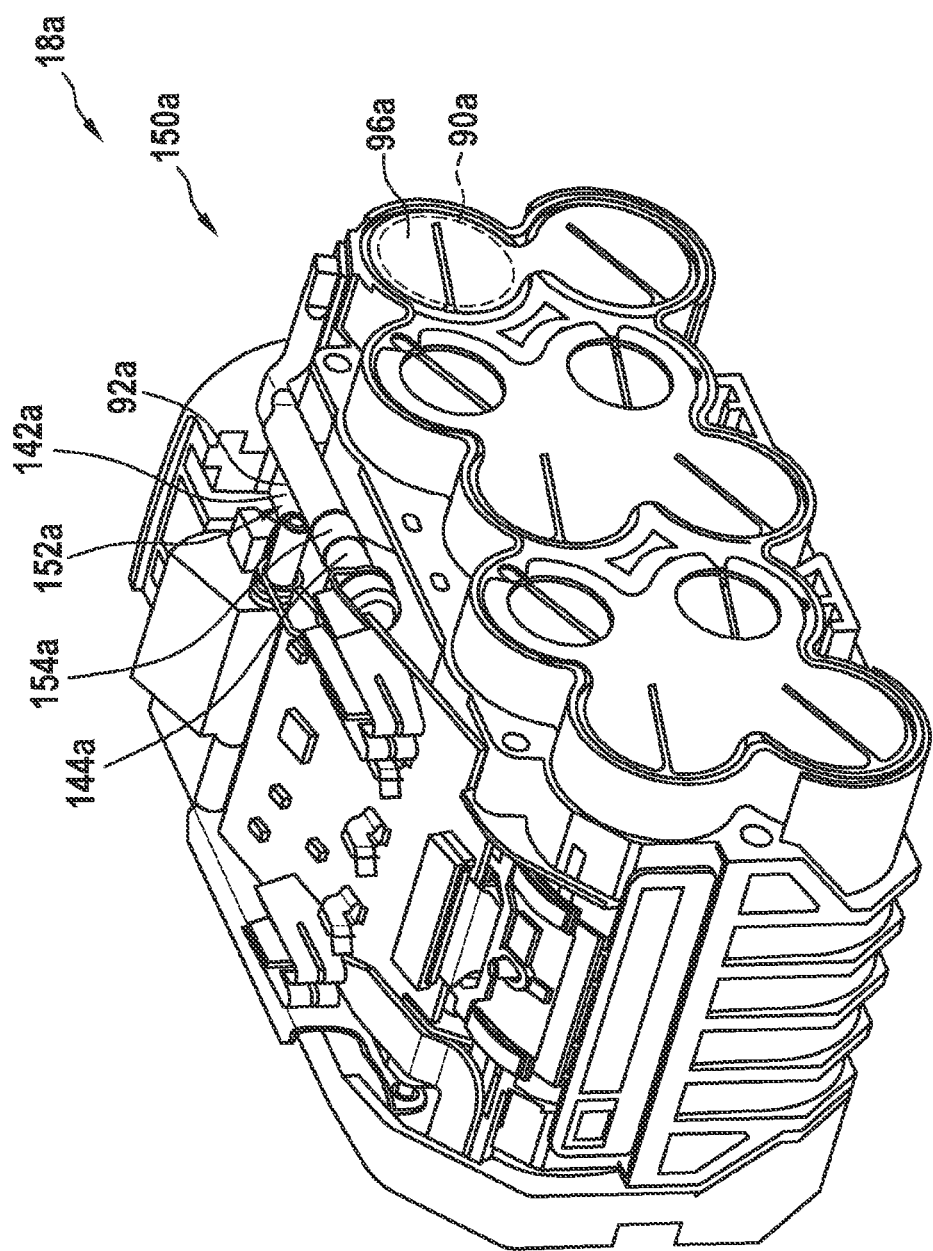
FIG. 17 shows a perspective view of one alternative specific embodiment of a rechargeable battery pack together with a partially disassembled housing.

FIG. 17 shows a perspective view of a rechargeable battery pack 18a together with one alternative specific embodiment of electrical contact device 98a including a tubular conductor 142a. Except for tubular conductor 142a, rechargeable battery pack 18a has a design that is essentially identical to rechargeable battery pack 18 described above. Tubular conductor 142a includes a first end 150a and a second end 152a, tubular conductor 142a at its second end 152a being connected to fuse elements 144a, designed as a safety fuse, via a cross-sectional change 154a. At its second end 152a, tubular conductor 142a is directly integrally joined to cell connector 96a. This is achieved by bending tubular conductor 142a at its second flattened end 152a and in two directions. On the one hand, tubular conductor 142a at its second end 152a is bent downwardly or in the direction of the side of cell housing 50a that includes radial openings 92a, and on the other hand is bent outwardly or in the direction of the side of cell housing 50a that includes axial openings 90a.

Figure 18:
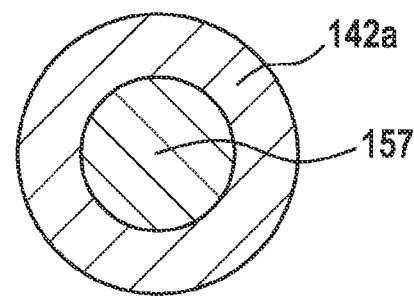
FIG. 18 shows a cross section of an electrical contact device of the rechargeable battery pack according to FIG. 17.

FIG. 18 shows a cross section of tubular conductor 142a. A heat storage element 157a is situated within tubular conductor 142a. Heat storage element 157a is made of a plastic by way of example, in particular high-density polyethylene (HDPE). Heat that develops due to the current flow within tubular conductor 142a may advantageously be absorbed and temporarily stored in heat storage element 157a. The absorbed energy is released from heat storage element 157a back to the surroundings in a delayed manner, as the result of which the amplitude of the temperature fluctuations may be greatly reduced. Heat storage element 157a preferably completely fills tubular conductor 142a between flattened end 152a and cross-sectional change 154a.

Figure 19:
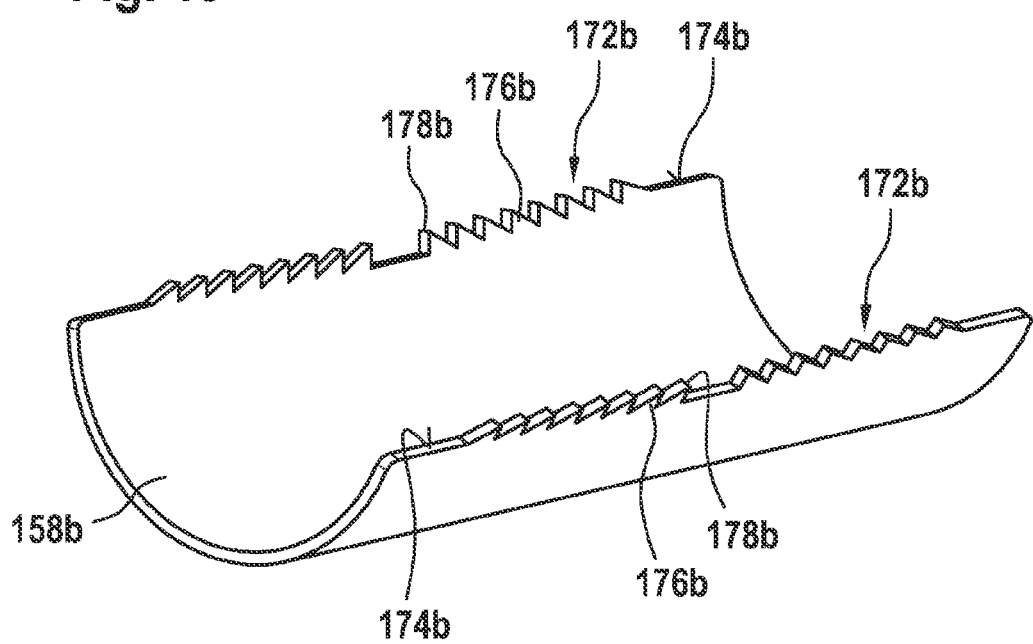
FIG. 19 shows a perspective view of one alternative specific embodiment of a protective element.
Figure 20:
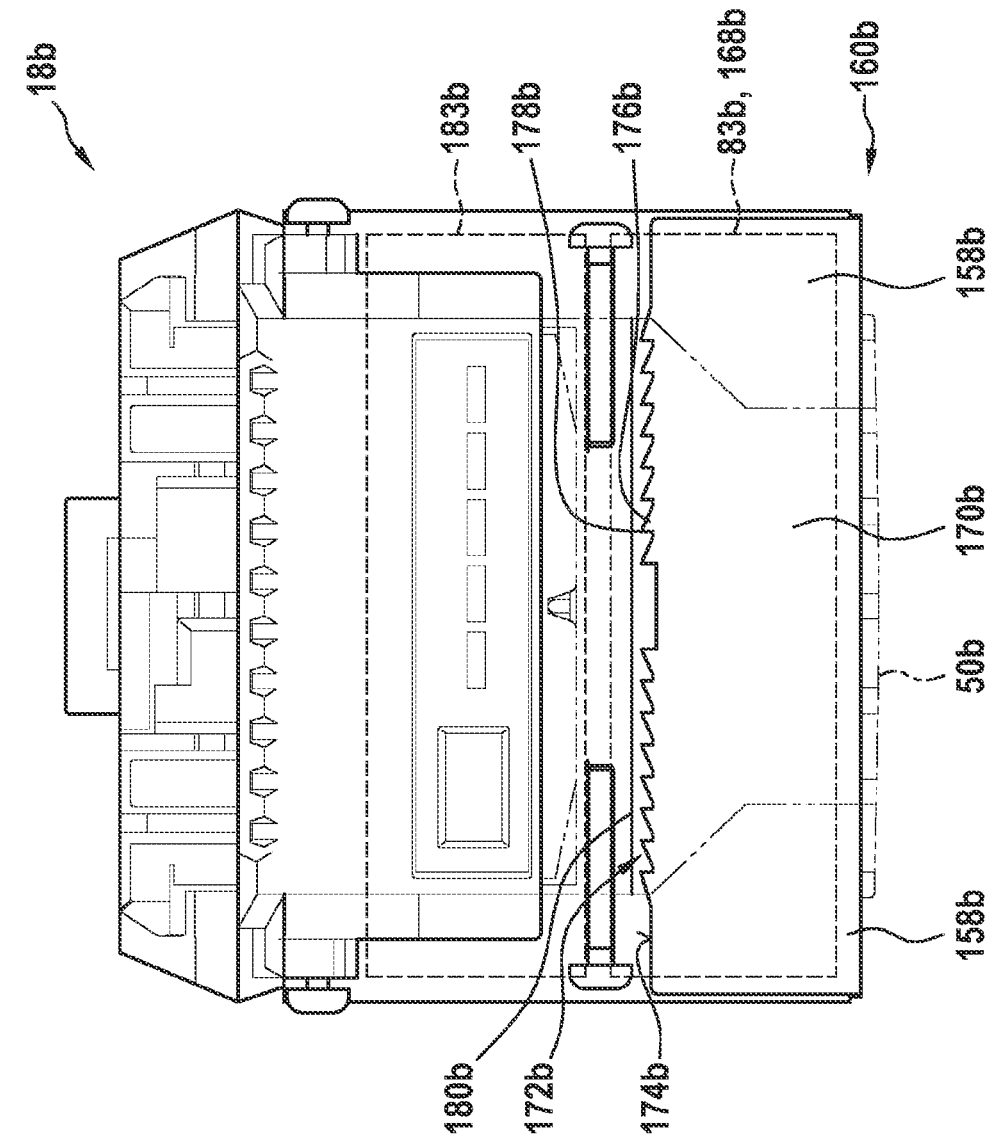
FIG. 20 shows a front view of a rechargeable battery pack together with the protective element according to FIG. 19.

FIG. 19 shows a perspective view of one alternative specific embodiment of protective element 158b. FIG. 20 shows one alternative specific embodiment of rechargeable battery pack 18 together with protective element 158b in a front view. For a better overview, cell housing 50b is illustrated transparently and the side walls are not depicted in FIG. 20. Rechargeable battery pack 18b includes a single protective element 158b for each edge-side rechargeable battery cell 168b of the lower layer of rechargeable battery cells 83b. Protective element 158b has a length that essentially corresponds to the length of rechargeable battery cells 83b. Cell housing 50b includes a receiving pocket 170b in which protective element 158b is accommodated. Receiving pocket 170b does not include a stop, so that protective element 158b may be partially pushed through receiving pocket 170b for connection to cell housing 50b. Protective element 158b circumferentially encloses edge-side rechargeable battery cell 168b in an angular range of approximately 170°, analogously to the preceding exemplary embodiment.

In addition, protective element 158b includes energy absorption elements 172b. Energy absorption elements 172b are situated at two opposite longitudinal edges 174b of protective element 158b. Longitudinal edges 174b extend in parallel to the longitudinal axis of rechargeable battery cells 83b. Energy absorption elements 172b are designed by way of example as toothing with tooth elements 176b, tooth elements 176b each including a tip 178b. In the installed state, tips 178b of tooth elements 176b rest against cell housing 50b, in particular against a wall 180b within receiving pocket 170b. In particular, along longitudinal edge 174b, protective element 158b rests against a flat wall of cell housing 50b only via tooth elements 176b or tips 178b. However, it is also possible for protective element 158b, along longitudinal edge 174b, to rest against a wall within receiving pocket 170b via toothing that is shape-adapted, in particular adapted to the toothing of protective element 158b. Alternatively or additionally, it is also possible for energy absorption element 172b in the area of the longitudinal edge 174b to have a design that is spaced apart from a stop within receiving pocket 170b, the distance preferably being less than the height of tooth elements 176b.

In the event of a fall of rechargeable battery pack 18b onto an edge 160b, a force acts on protective elements 158b that results in protective elements 158b deforming and/or changing their position, and energy absorption elements 172b, in particular tips 178b of toothing, penetrating into and thus deforming cell housing 50b. Due to deformation of cell housing 50b, energy is absorbed which advantageously does not act on rechargeable battery cells 83b, and advantageously protects them.

Figure 21:
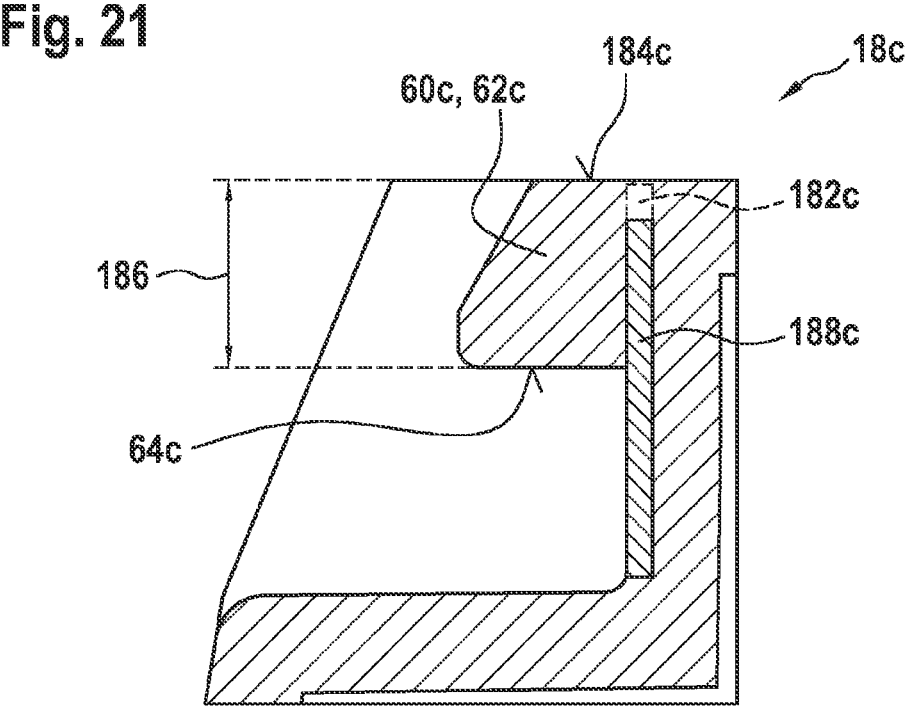
FIG. 21 shows a cross section of one alternative specific embodiment of a mechanical interface.

FIG. 21 shows one alternative specific embodiment of a rechargeable battery pack 18c together with a predetermined breaking point 182c in a cross section of retaining element 60c designed as a guide rail 62c. Predetermined breaking point element 188c is designed as a metal sheet that extends in parallel to the connection direction of rechargeable battery pack 18c or to the longitudinal extension of sliding surface 64 of rechargeable battery pack 18c. In the cross section, predetermined breaking point element 188c has a length or height that is greater than material thickness 186c of retaining element 60c. Predetermined breaking point element 188c is enclosed by interface housing 52c. Predetermined breaking point element 188c is situated in such a way that it forms side wall 70c of guide groove 66c and extends linearly in the direction of top side 184c of retaining element 60c. Predetermined breaking point element 188c thus extends perpendicularly with respect to sliding surface 64c. The area between predetermined breaking point element 188c and top side 184c forms predetermined breaking point 182c.

Figure 22:
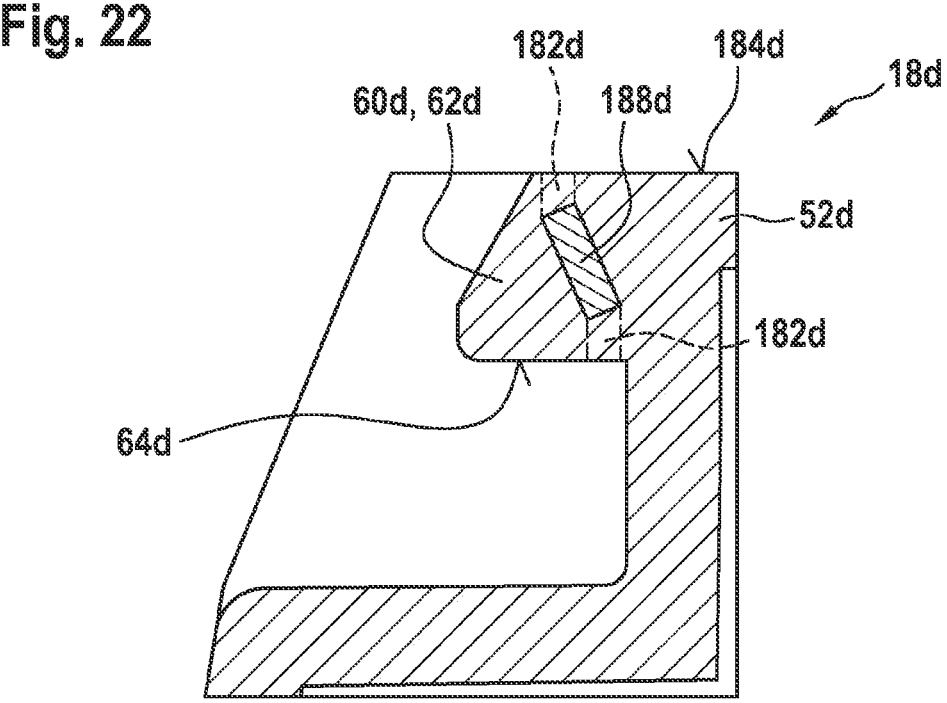
FIG. 22 shows a cross section of a further alternative specific embodiment of a mechanical interface.

FIG. 22 shows a further alternative specific embodiment of a rechargeable battery pack 18d together with a predetermined breaking point 182d in a cross section of retaining element 60d designed as a guide rail 62d. Predetermined breaking point element 188d is made of a plastic that has a low adhesion to the plastic of which interface housing part 52d or retaining element 60c is made. Predetermined breaking point element 188d has a bar-shaped design, has a rectangular shape in the cross section, and extends in parallel to the connection direction of rechargeable battery pack 18d or in parallel to the longitudinal extension of sliding surface 64d of rechargeable battery pack 18d. Predetermined breaking point element 188d is situated completely within retaining element 60d. In particular, predetermined breaking point element 188d is situated completely between sliding surface 64d and top side 184d of retaining element 60d. Retaining element 60d thus includes two predetermined breaking points 182d, one predetermined breaking point 182d being situated between predetermined breaking point element 188d and top side 184d of retaining element 60d, and other predetermined breaking point 182d being situated between predetermined breaking point element 188d and sliding surface 64d. In the cross section, predetermined breaking point element 188*d* extends obliquely to sliding surface 64*d*. Predetermined breaking points 182*d* are thus offset relative to one another. Alternatively, it is also possible for predetermined breaking point element 188*d* to extend essentially perpendicularly with respect to sliding surface 64*d*, as the result of which two predetermined breaking points 182*d*, one situated one above the other, are formed.

Figure 23:
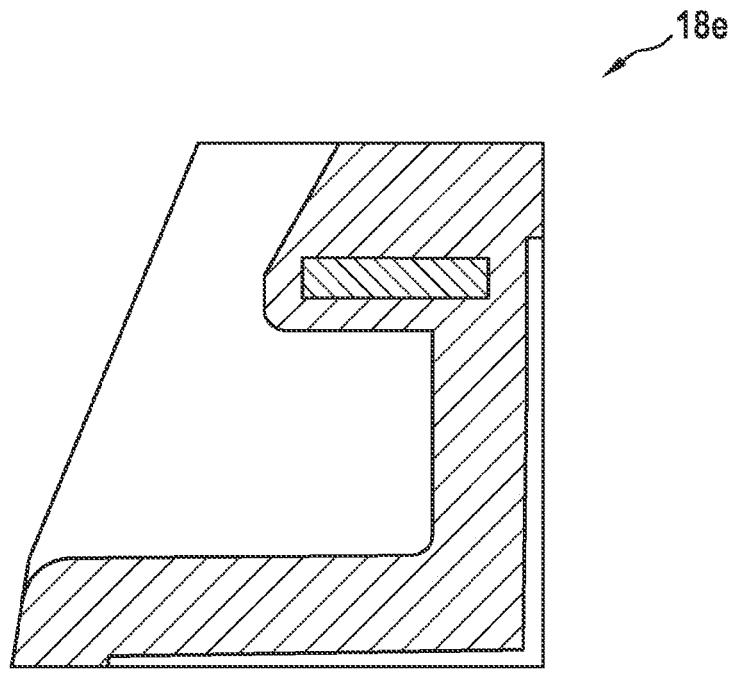
FIG. 23 shows a cross section of a third alternative specific embodiment of a mechanical interface.

FIG. 23 shows a further alternative specific embodiment of a rechargeable battery pack 18*e* together with a predetermined breaking point 182*e* in a cross section of retaining element 60*e* designed as a guide rail 62*e*. Predetermined breaking point element 188*e* has a bar-shaped design, and in the cross section is situated in parallel to sliding surface 64*e*. Predetermined breaking point element 188*e* is completely enclosed by interface housing part 52*e*, in particular by retaining element 60*e*. The distance of predetermined breaking point element 188*e* from sliding surface 64*e* is less than the distance from top side 184*e* of retaining element 60*e*. Predetermined breaking point element 188*e* is designed as a cavity by way of example, as the result of which retaining element 60*e* is locally weakened. Predetermined breaking point 182*e* is thus situated between predetermined breaking point element 188*e* and sliding surface 64*e*.

Figure 24:
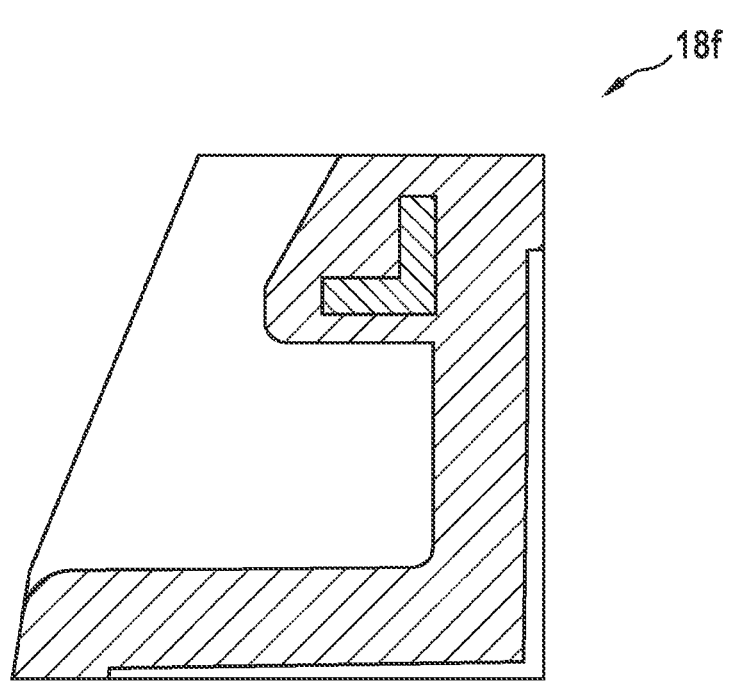
FIG. 24 shows a cross section of a fourth alternative specific embodiment of a mechanical interface.

FIG. 24 shows a further alternative specific embodiment of a rechargeable battery pack 18*f* together with a predetermined breaking point 182*f* in a cross section of retaining element 60*f* designed as a guide rail 62*f*. Predetermined breaking point element 188*f* is designed as a leg 190*f* of an angular element 192*f*. Angular element 192*f* is designed as a metal bracket. Angular element 192*f* also includes a second leg 194*f* that is designed as a wear protection element 200*f*. The two legs 190*f*, 194*f* of the angle are designed by way of example with the same length in the cross section. Predetermined breaking point element 188*f* extends perpendicularly with respect to sliding surface 64*f* of retaining element 60*f*, while wear protection element 200*f* extends in parallel to sliding surface 64. The angle is situated completely within retaining element 60*f*, in particular completely between sliding surface 64*f* and top side 184*f* of retaining element 60*f*. Predetermined breaking point 182*f* is situated between predetermined breaking point element 188*f* and top side 184*f* of retaining element 60*f*. Since wear protection element 200*f* is initially completely enclosed by retaining element 60*f*, in particular the plastic of retaining element 60*f*, wear protection element 200*f* fulfills its function only after a certain level of wear has occurred and the plastic between sliding surface 64*f* and wear protection element 200*f* is at least partially worn away.

What is claimed is:

1. A rechargeable battery pack for a hand-held power tool, comprising:
   a housing in which at least one rechargeable battery cell; and
   at least one protective element that is connected to the housing,
   wherein the at least one rechargeable battery cell is situated in a cell housing, the protective element being situated inside and/or outside the cell housing,
   wherein the cell housing includes at least one receiving area for the at least one rechargeable battery cell, the receiving area being delimited by a wall against whose inner side the rechargeable battery cell rests, and against whose outer side the protective element rests,
   wherein the wall and the protective element are adapted, at least in part, to an outer contour of the at least one rechargeable battery cell,
   wherein the protective element is made of a metallic material.

2. The rechargeable battery pack as recited in claim 1, wherein the at least one rechargeable battery cell includes a metallic cell jacket, and the protective element has a greater wall thickness than the cell jacket of the at least one rechargeable battery cell.

3. The rechargeable battery pack as recited in claim 1, wherein the protective element is connected to the housing in a force-fit manner and/or a form-fit manner.

4. The rechargeable battery pack as recited in claim 1, wherein the protective element has a greater rigidity than the housing, a rigidity of the protective element being at least ten times greater than the housing.

5. The rechargeable battery pack as recited in claim 1, wherein the protective element is situated in a receiving pocket of the cell housing, the protective element being fastened in the cell housing in a force-fit manner in the receiving pocket of the cell housing.

6. The rechargeable battery pack as recited in claim 1, wherein the at least one rechargeable battery cell is protected by the protective element along at least 50% of a length of the at least one rechargeable battery cell.

7. The rechargeable battery pack as recited in claim 1, wherein the at least one rechargeable battery cell is protected by the protective element along at least 75% of a length of the at least one rechargeable battery cell.

8. The rechargeable battery pack as recited in claim 1, wherein the at least one rechargeable battery cell is protected by the protective element along at least 90% of a length of the at least one rechargeable battery cell.

9. The rechargeable battery pack as recited in claim 1, wherein the protective element is situated in an area of an edge of the rechargeable battery pack that extends in parallel to a longitudinal extension of the at least one rechargeable battery cell.

10. The rechargeable battery pack as recited in claim 1, wherein the rechargeable battery pack includes a mechanical interface for detachably connecting the rechargeable battery pack to a hand-held power tool, the protective element being situated spaced apart from the mechanical interface on a side of the rechargeable battery pack opposite from the mechanical interface.

11. The rechargeable battery pack as recited in claim 1, wherein the protective element is coupled to an energy absorption element, the energy absorption element being configured in such a way that the energy absorption element under an application of force penetrates at least partially into the housing into the cell housing.

12. The rechargeable battery pack as recited in claim 11, wherein the energy absorption element is configured as toothing.

13. A system, comprising:
   a hand-held power tool; and
   a rechargeable battery pack including a housing in which at least one rechargeable battery cell, and at least one protective element that is connected to the housing;
   wherein the housing of the rechargeable battery pack in a connected state partially forms an outer surface of the system; and
   wherein the protective element is situated between an area of the rechargeable battery pack that forms the outer surface of the system, and at least one rechargeable battery cell, wherein the at least one rechargeable battery cell is situated in a cell housing, the protective element being situated inside and/or outside the cell housing, wherein the cell housing includes at least one receiving area for the at least one rechargeable battery cell, the receiving area being delimited by a wall against whose inner side the rechargeable battery cell rests, and against whose outer side the protective element rests, wherein the wall and the protective element are adapted, at least in part, to an outer contour of the at least one rechargeable battery cell, wherein the protective element is made of a metallic material.

14. The rechargeable battery pack as recited in claim 1, wherein the metallic material includes steel, or titanium, or aluminum.

15. The system as recited in claim 13, wherein the metallic material includes steel, or titanium, or aluminum.

\* \* \* \* \*